United States Patent
Oyama et al.

(10) Patent No.: US 10,277,328 B2
(45) Date of Patent: Apr. 30, 2019

(54) SIGNAL PROCESSING DEVICE USED IN OPTICAL RECEIVER AND SIGNAL PROCESSING METHOD

(71) Applicant: FUJITSU LIMITED, Kawasaki-shi, Kanagawa (JP)

(72) Inventors: Tomofumi Oyama, Kawasaki (JP); Hisao Nakashima, Kawasaki (JP); Yoshitaka Nomura, Shinagawa (JP); Takeshi Hoshida, Kawasaki (JP); Takahito Tanimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/637,389

(22) Filed: Jun. 29, 2017

(65) Prior Publication Data
US 2018/0034552 A1 Feb. 1, 2018

(30) Foreign Application Priority Data
Jul. 27, 2016 (JP) .................. 2016-147849

(51) Int. Cl.
*H04B 10/61* (2013.01)
*H04J 14/06* (2006.01)
(Continued)

(52) U.S. Cl.
CPC .......... *H04B 10/6162* (2013.01); *G02B 6/00* (2013.01); *G02B 6/12009* (2013.01);
(Continued)

(58) Field of Classification Search
CPC ............ H04B 10/6162; H04B 10/6165; H04B 10/25073; H04B 10/614; G03H 1/0005;
(Continued)

(56) References Cited

U.S. PATENT DOCUMENTS

2009/0196602 A1 8/2009 Saunders et al.
2016/0142179 A1* 5/2016 Fludger ............ H04B 10/25137
398/65

FOREIGN PATENT DOCUMENTS

| JP | 2011-514736 | 5/2011 |
| JP | 2013-016978 | 1/2013 |
| WO | 2009-100252 | 8/2009 |

\* cited by examiner

*Primary Examiner* — Leslie C Pascal
(74) *Attorney, Agent, or Firm* — Fujitsu Patent Center

(57) ABSTRACT

A signal processing device processes an electric field information signal indicating a polarization multiplexed optical signal in which different modulation formats are used. A first optical signal transmitted in a first polarization component and a second optical signal transmitted in a second polarization component are multiplexed in the polarization multiplexed optical signal. The signal processing device includes a generator and a compensation circuit. The generator selects the first polarization component or the second polarization component based on modulation formats of the first and second optical signals, and generates a compensation value for compensating for an electric field information signal of a selected polarization component based on the electric field information signal of the selected polarization component. The compensation circuit compensates for electric field information signals of the first and second polarization components using the compensation value generated by the generator.

8 Claims, 19 Drawing Sheets

(51) Int. Cl.
  *G02B 6/42*     (2006.01)
  *H04B 10/2507*  (2013.01)
  *H04L 7/00*     (2006.01)
  *G03H 1/00*     (2006.01)
  *G02B 6/12*     (2006.01)
  *H04J 14/02*    (2006.01)
  *G02B 6/00*     (2006.01)

(52) U.S. Cl.
  CPC ......... *G02B 6/4216* (2013.01); *G02B 6/4246* (2013.01); *G03H 1/0005* (2013.01); *H04B 10/25073* (2013.01); *H04B 10/614* (2013.01); *H04B 10/6165* (2013.01); *H04J 14/0221* (2013.01); *H04J 14/06* (2013.01); *H04L 7/0075* (2013.01)

(58) Field of Classification Search
  CPC ...... G02B 6/4246; G02B 6/00; G02B 6/4216; G02B 6/12009; H04J 14/0221; H04J 14/06; H04L 7/0075
  See application file for complete search history.

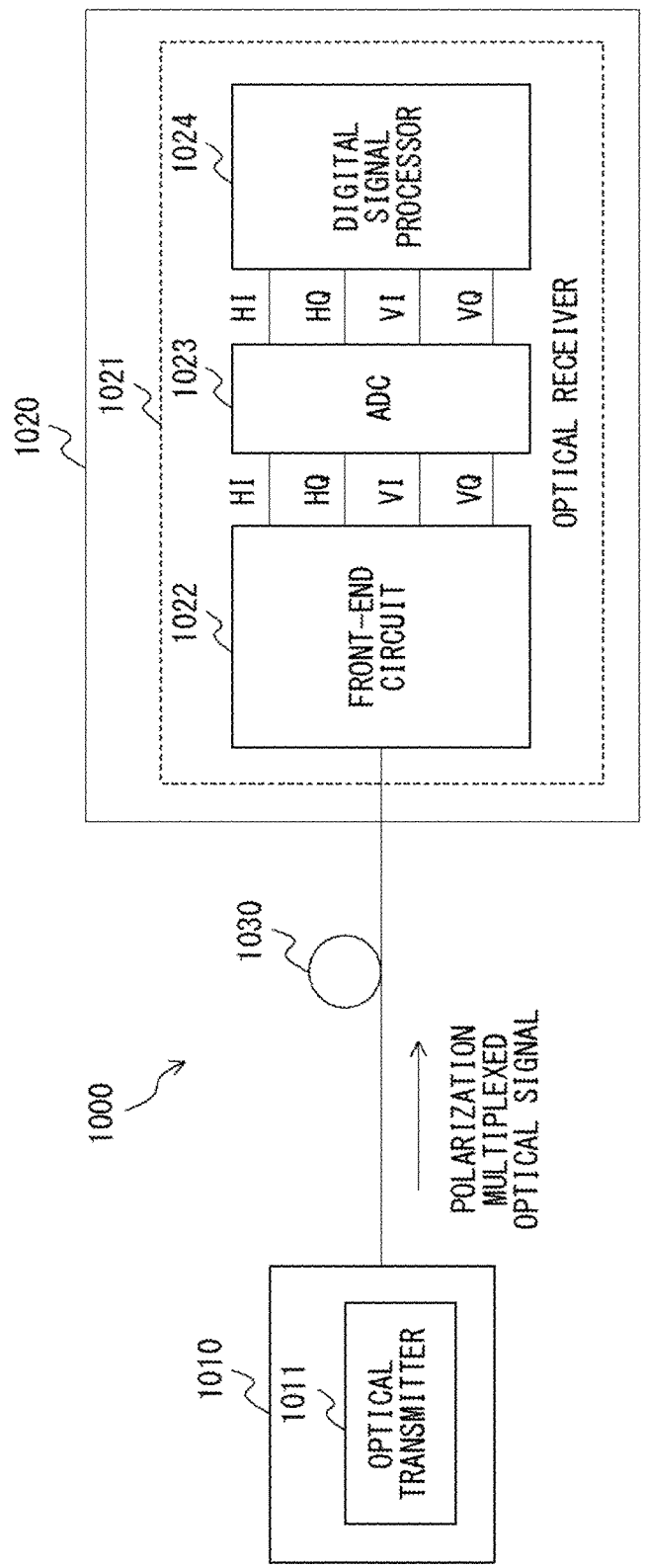
F I G. 1

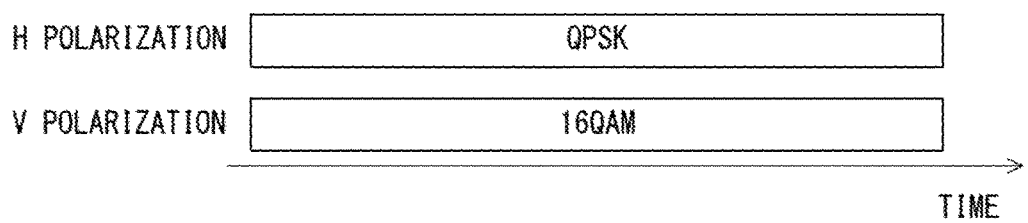
F I G. 2 A
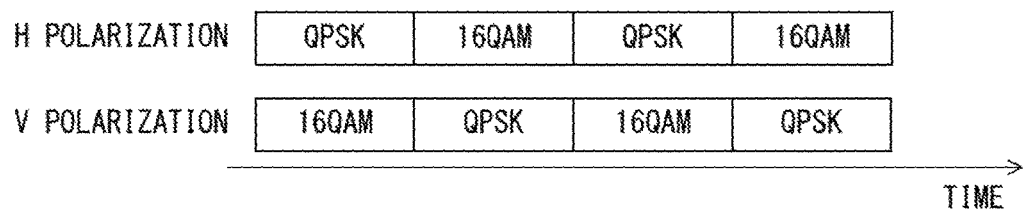
F I G. 2 B

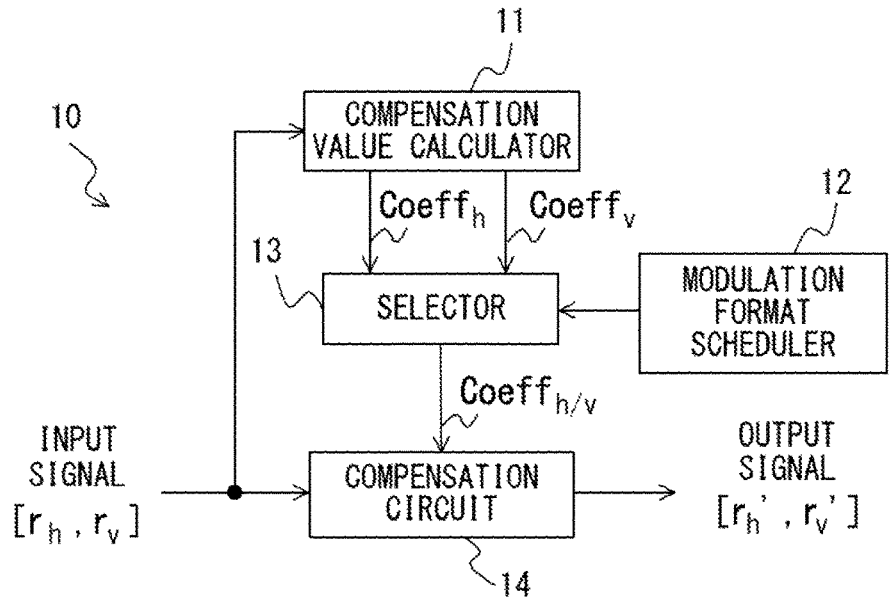
F I G. 6 A
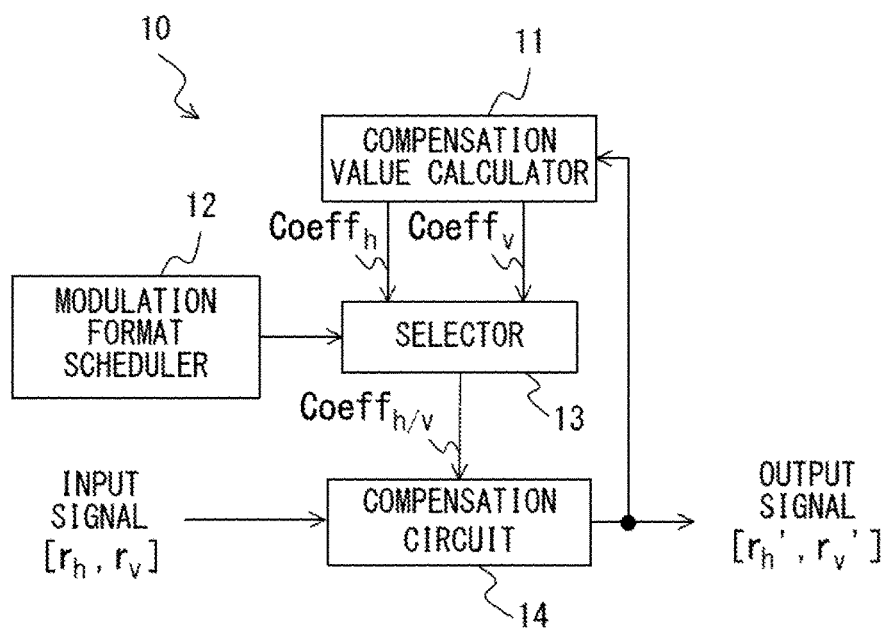
F I G. 6 B

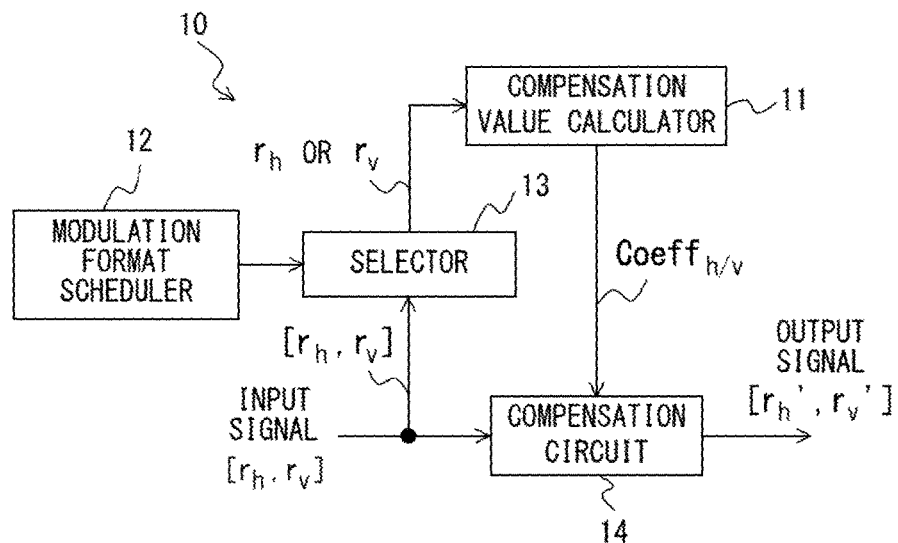
F I G. 7A
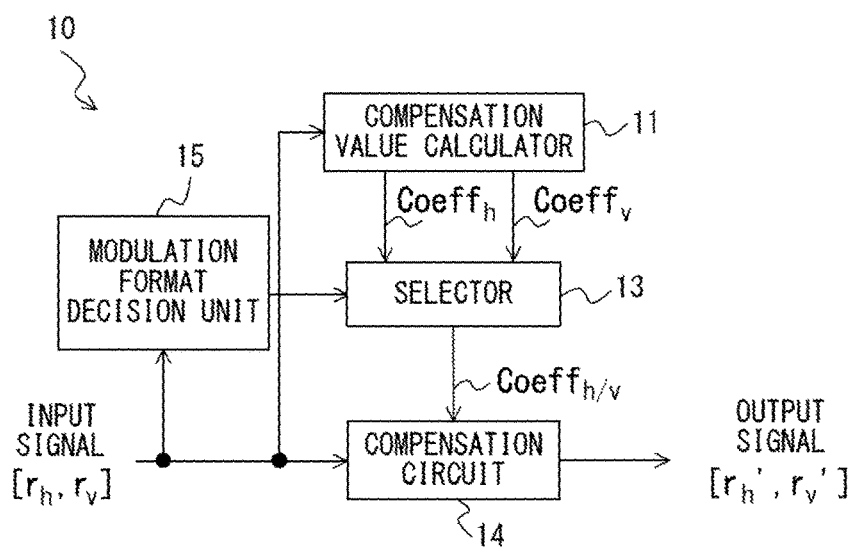
F I G. 7B

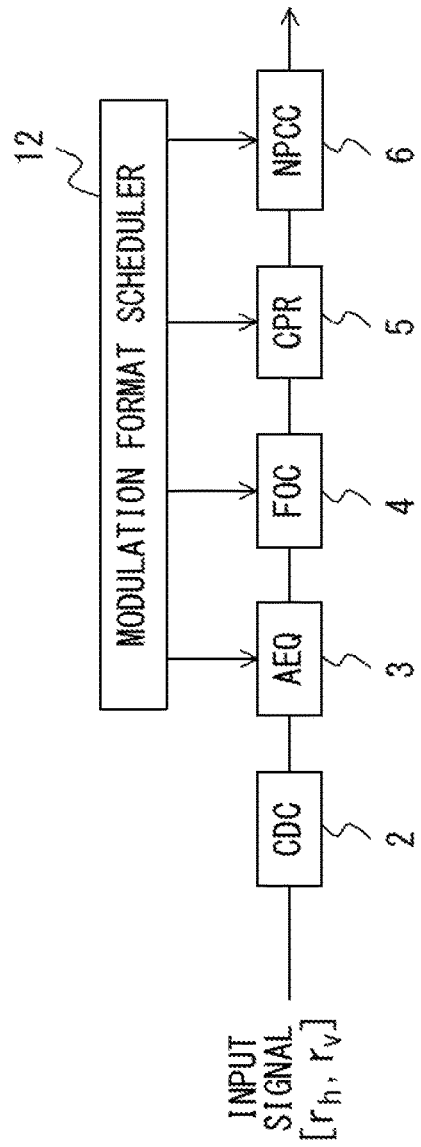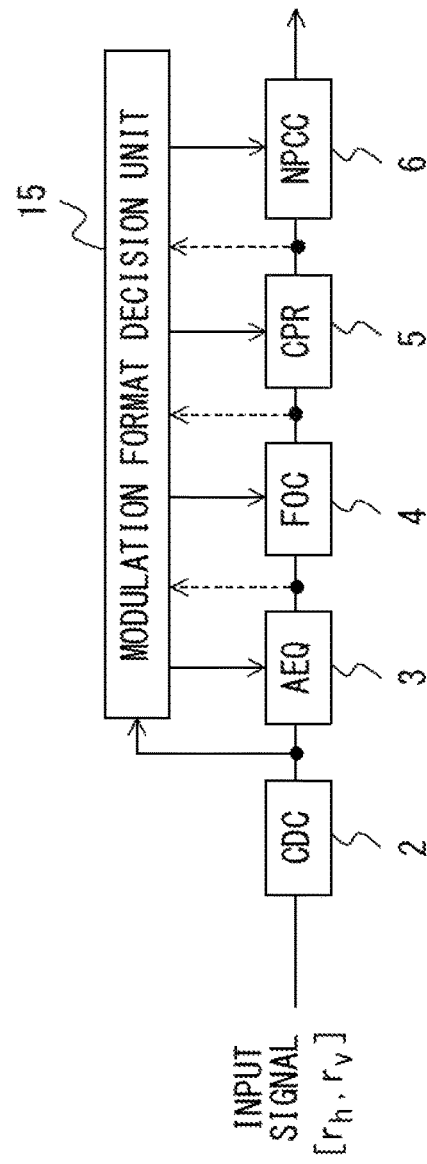

| SUMMED VALUE S | WEIGHT |
|---|---|
| 2 | 5.0 |
| 3 | 4.5 |
| 4 | 4.0 |
| 5 | 3.5 |
| 6 | 3.0 |
| 7 | 2.5 |
| 8 | 2.0 |
| ⋮ | ⋮ |

FIG. 18

SIGNAL PROCESSING DEVICE USED IN OPTICAL RECEIVER AND SIGNAL PROCESSING METHOD

CROSS-REFERENCE TO RELATED APPLICATION

This application is based upon and claims the benefit of priority of the prior Japanese Patent Application No. 2016-147849, filed on Jul. 27, 2016, the entire contents of which are incorporated herein by reference.

FIELD

The embodiments discussed herein are related to a signal processing device that is used in an optical receiver for receiving a polarization multiplexed optical signal and a signal processing method.

BACKGROUND

Reception nodes often receive an optical signal by digital coherent detection when a high-capacity communication or a long-distance communication is performed. Digital coherent receivers generate an electric field information signal that represents a received optical signal, and perform digital signal processing on the electric field information signal so as to recover data. The digital signal processing can compensate for a signal distortion due to a faulty device and/or the features of an optical fiber transmission link. For example, the digital signal processing can compensate for, for example, a dispersion of an optical fiber, a polarization variation in an optical fiber, the frequency response characteristics of an electronic device, phase noise of a laser, and a difference between a carrier frequency of an optical signal and a frequency of a local oscillator (a frequency offset).

On the other hand, polarization multiplexing has been put to practical use in order to realize a transmission of large volumes of data in an optical communication system. The polarization multiplexing transmits a signal using a set of polarizations that are orthogonal to each other. A modulation format of each signal channel is selected according to, for example, a transmission rate, a transmission distance, a desired quality (such as a signal-to-noise ratio: SNR). For example, BPSK, QPSK, 8 PSK, 8 QAM, 16 QAM, and 64 QAM have been put to practical use.

Further, in order to improve the frequency utilization efficiency in an optical communication system, a hybrid modulation that combines signals of different modulation formats in one signal channel and transmits them has been attracting attention. It is possible to use different modulation formats in a polarization domain, a time domain, and a frequency domain. For example, in a polarization multiplexing transmission, modulation formats of two signals transmitted using a set of polarizations may be different from each other. Further, a modulation format may be switched at specified time intervals in each polarization. The hybrid modulation may realize a desired transmission capacity or a desired transmittable distance by adjusting a combination ratio of a plurality of modulation formats.

As a related technology, an optical communication method for setting a signal bandwidth of a multilevel modulated signal to an optimal value according to a frequency spacing is proposed (for example, Japanese Laid-open Patent Publication No. 2013-16978). Further, a method is proposed that realizes a variable bit rate optical transmission using a programmable signal modulation (for example, Japanese National Publication of International Patent Application No. 2011-514736).

As described above, a digital coherent receiver can compensate for a signal distortion due to a faulty device and/or the features of an optical fiber transmission link. However, an accuracy of a compensation value (such as a filter coefficient of a digital filter) that is generated to compensate for a signal distortion depends on the number of bits per symbol of a modulation format. The number of bits per symbol represents the number of bits transmitted for each symbol. For example, the number of bits per symbol of QPSK and 16 QAM are two and four, respectively.

Specifically, an accuracy of a compensation value is lower if the number of bits per symbol of a modulation format is larger. Thus, when a polarization multiplexed optical signal is transmitted by hybrid modulation in which a plurality of different modulation formats are used in time domain and/or polarization domain, the accuracy of a compensation value to compensate for a signal distortion may be decreased. When the accuracy of a compensation value is low, a signal distortion is not sufficiently compensated for, which may result in degrading a bit error rate of recovered data.

SUMMARY

According to an aspect of the present invention, a signal processing device processes an electric field information signal indicating a polarization multiplexed optical signal in which different modulation formats are used, a first optical signal transmitted in a first polarization component and a second optical signal transmitted in a second polarization component that is orthogonal to the first polarization component being multiplexed in the polarization multiplexed optical signal. The signal processing device includes: a generator configured to select the first polarization component or the second polarization component based on a modulation format of the first optical signal and a modulation format of the second optical signal, and to generate a compensation value for compensating for an electric field information signal of a selected polarization component based on the electric field information signal of the selected polarization component; and a compensation circuit configured to compensate for an electric field information signal of the first polarization component and an electric field information signal of the second polarization component using the compensation value generated by the generator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical communication system according to embodiments of the present invention;

FIGS. 2A and 2B illustrate examples of a hybrid modulation;

FIGS. 6A, 6B, 7A, and 7B are block diagrams that illustrate functions of a compensator that compensates for an input signal;

FIGS. 8A and 8B illustrate examples of a configuration of a digital signal processor included in an optical receiver;

FIG. 18 illustrates an example of a look-up table that indicates a relationship between the number of bits per symbol and a weight.

DESCRIPTION OF EMBODIMENTS

Figure 3:
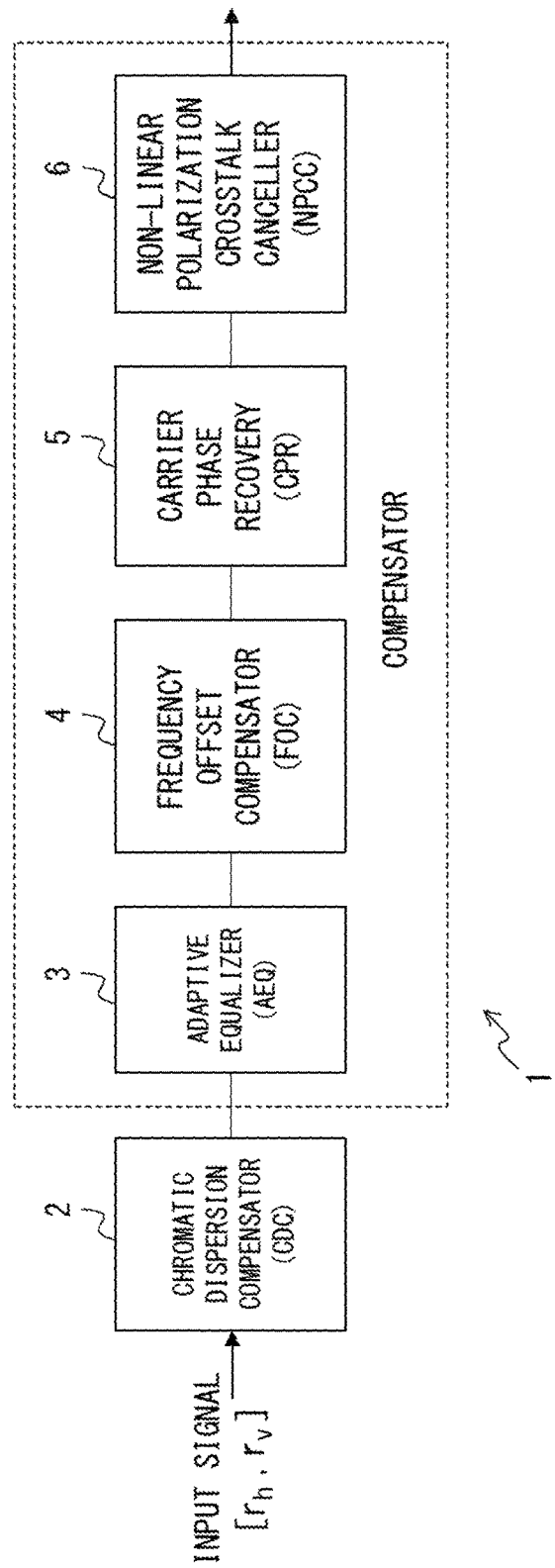
FIG. 3 illustrates an example of functions of a digital signal processor.

FIG. 1 illustrates an example of an optical communication system according to embodiments of the present invention. An optical transmission system 1000 illustrated in FIG. 1 includes a node 1010 and a node 1020. The node 1010 and the node 1020 are connected by an optical fiber link 1030. A relay node may be provided on the optical fiber link 1030.

The node 1010 includes an optical transmitter 1011 that generates a polarization multiplexed optical signal. The polarization multiplexed optical signal generated by the optical transmitter 1011 is transmitted through the optical fiber link 1030.

The node 1020 includes an optical receiver 1021 that receives a polarization multiplexed optical signal. The optical receiver 1021 includes a front-end circuit 1022, an A/D (Analog-to-Digital) converter 1023, and a digital signal processor 1024. The front-end circuit 1022 generates electric field information signals HI, HQ, VI, and VQ that represent the received polarization multiplexed optical signal. The electric field information signals HI and HQ respectively represent an I component and a Q component of an H polarization of a polarization multiplexed optical signal. In other words, the electric field information signals HI and HQ are electric signals that represent a phase and an amplitude of the H polarization of the polarization multiplexed optical signal. The electric field information signals VI and VQ respectively represent an I component and a Q component of a V polarization of the polarization multiplexed optical signal. In other words, the electric field information signals VI and VQ are electric signals that represent a phase and an amplitude of the V polarization of the polarization multiplexed optical signal. The A/D converter 1023 converts each of the electric field information signals HI, HQ, VI, and VQ into a digital signal. The digital signal processor 1024 recovers data carried by the polarization multiplexed optical signal based on the digital electric field information signals HI, HQ, VI, and VQ.

In the optical transmission system 1000, a polarization multiplexed optical signal generated by hybrid modulation is transmitted. In other words, a polarization multiplexed optical signal in which different modulation formats are used in at least one of a polarization domain and a time domain is transmitted from the optical transmitter 1011 to the optical receiver 1021.

FIG. 2A illustrates an example of a polarization-domain hybrid modulation. The polarization-domain hybrid modulation may use different modulations in a polarization domain. In other words, the polarization-domain hybrid modulation may use different modulation formats for an optical signal transmitted in an H polarization and an optical signal transmitted in a V polarization. In the example illustrated in FIG. 2A, a QPSK optical signal is transmitted in H polarization, and a 16 QAM optical signal is transmitted in V polarization.

FIG. 2B illustrates an example of a polarization/time-domain hybrid modulation. The polarization/time-domain hybrid modulation may use different modulations in each of a polarization domain and a time domain. In other words, the polarization/time-domain hybrid modulation may use different modulation formats for an optical signal transmitted in an H polarization and an optical signal transmitted in a V polarization, and may also switch a modulation format with respect to time in each polarization. In the example illustrated in FIG. 2B, a QPSK optical signal and a 16 QAM optical signal are alternately transmitted in each polarization.

A time-domain hybrid modulation may use a plurality of modulation formats at a desired combination ratio. Thus, the time-domain hybrid modulation can realize desired number of bits that can be transmitted for each symbol. For example, it is 2 bits/symbol/polarization in the case of QPSK, and it is 4 bits/symbol/polarization in the case of 16 QAM. Thus, 3 bits/symbol/polarization will be realized if the combination ratio of QPSK and 16 QAM is 1:1, and 2.5 bits/symbol/polarization will be realized if the combination ratio of QPSK and 16 QAM is 3:1.

FIG. 3 illustrates an example of functions of a digital signal processor that processes a received signal. A digital signal processor 1 illustrated in FIG. 3 corresponds to the digital signal processor 1024 in the example illustrated in FIG. 1. The digital signal processor 1 may include other functions that are not illustrated in FIG. 3. Further, the digital signal processor 1 may include a function that processes a transmission signal in addition a function that processes a received optical signal.

The digital signal processor 1 includes a chromatic dispersion compensator (CDC) 2, an adaptive equalizer (AEQ) 3, a frequency offset compensator (FOC) 4, a carrier phase recovery (CPR) 5, and a non-linear polarization crosstalk canceller (NPCC) 6. An electric field information signal generated by a front-end circuit is input to the digital signal processor 1. In the example illustrated in FIG. 1, this electric field information signal corresponds to HI, HQ, VI, and VQ in the example illustrated in FIG. 1. A signal $r_h$ corresponds to the electric field information signals HI and HQ that represent a phase and an amplitude of an H polarization. A signal $r_v$ corresponds to the electric field information signals VI and VQ that represent a phase and an amplitude of a V polarization.

The chromatic dispersion compensator 2 compensates for a chromatic dispersion that occurs in an optical fiber. The adaptive equalizer 3 separates polarizations from each other while tracking a variation in polarization and a polarization mode dispersion and so on. When a chromatic dispersion remains in an output signal of the chromatic dispersion compensator 2, the adaptive equalizer 3 can compensate for the remaining chromatic dispersion. Further, the adaptive equalizer 3 can also compensate for a signal band narrowing that occurs in an electric device or an optical device. The frequency offset compensator 4 compensates for a difference between a frequency of a light source of an optical transmitter and a frequency of a local light source of an optical receiver (that is, a frequency offset). The carrier phase recovery (CPR) 5 compensates for phase noise of a light source. When a frequency offset remains in an output signal of the frequency offset compensator 4, the carrier phase recovery 5 can compensate for the remaining frequency offset. The non-linear polarization crosstalk canceller 6 compensates for a non-linear polarization crosstalk. The non-linear polarization crosstalk occurs due to non-linear optical effects in an optical fiber, and varies power between polarizations.

In the digital signal processor 1 described above, the adaptive equalizer 3, the frequency offset compensator 4, the carrier phase recovery 5, and the non-linear polarization crosstalk canceller 6 detect a phase and an amplitude of each polarization component and compensate for an electric field information signal using a result of the detection. Thus, the adaptive equalizer 3, the frequency offset compensator 4, the carrier phase recovery 5, and the non-linear polarization crosstalk canceller 6 may hereinafter be referred to as a "compensator". The "compensating for an electric field information signal" includes separating a polarization, compensating for a frequency offset, compensating for or recovering a carrier phase, and cancelling a non-linear polarization crosstalk.

An amplitude-directed algorithm is widely used for compensating for an electric field information signal. For example, the adaptive equalizer 3 can use the RDE (radius-directed equalization). The carrier phase recovery 5 can use the radius-directed Viterbi and Viterbi algorithm.

First, the amplitude-directed algorithm decides an amplitude of a received symbol. After that, a phase of the received symbol is detected using, for example, an n-th power law.

Figure 4A:
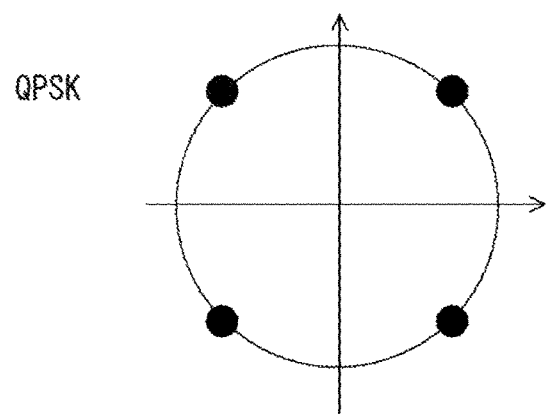
FIGS. 4A-4C illustrate constellations of modulation formats.

As illustrated in FIG. 4A, the amplitude of each symbol is substantially the same in a QPSK-modulated optical signal. Thus, there is a low probability that a received symbol will be identified erroneously.

Figure 4B:
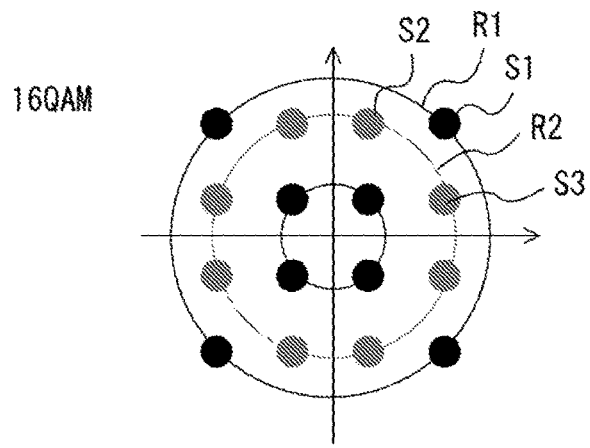

As illustrated in FIG. 4B, the amplitude of each symbol depends on the value of transmission data in a 16 QAM-modulated optical signal. Thus, if the amplitude of a received symbol is decided erroneously, the received symbol will not be identified correctly. For example, it is assumed that an optical receiver receives a symbol S1. In this case, if an amplitude is correctly decided, an amplitude R1 will be obtained. However, it is assumed that, here, the amplitude of the received symbol is decided to be R2 due to an amplitude decision error. In this case, if the phase is recovered using an n-th power law for the amplitude R2, there is a possibility that the received symbol will be decided to be S2 or S3. In other words, if the amplitude decision on the received symbol has been unsuccessful, the received symbol will be decided erroneously.

Figure 4C:
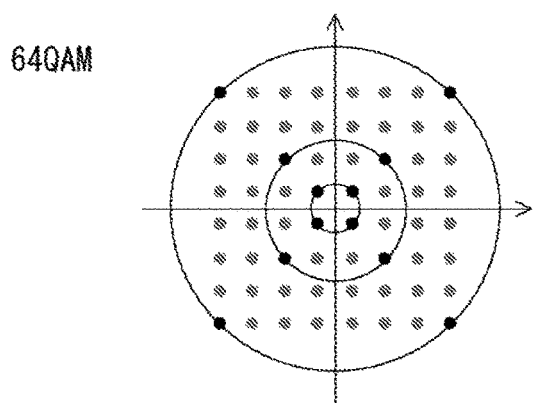

If the number of bits per symbol of a modulation format is larger, the probability that an amplitude decision error will occur is higher. For example, the number of amplitudes to be decided is larger when the 64 QAM-modulated optical signal illustrated in FIG. 4C is transmitted than when a 16 QAM-modulated optical signal is transmitted. Thus, the probability that an amplitude decision error will occur is higher in the case of 64 QAM than in the case of 16 QAM. In addition, the probability that a symbol that belongs to each amplitude will exist is lower if the number of bits per symbol of a modulation format is larger, which may result in decreasing a phase estimation accuracy.

In the descriptions below, the "number of bits per symbol" may be referred to as a "multi-value level". For example, the multi-value levels of QPSK, 16 QAM, and 64 QAM are 2, 4, and 6, respectively. Note that, when the number of bits per symbol is large, the multi-value level is "high". On the other hand, when the number of bits per symbol is small, the multi-value level is "low".

Figures 5A, 5B:
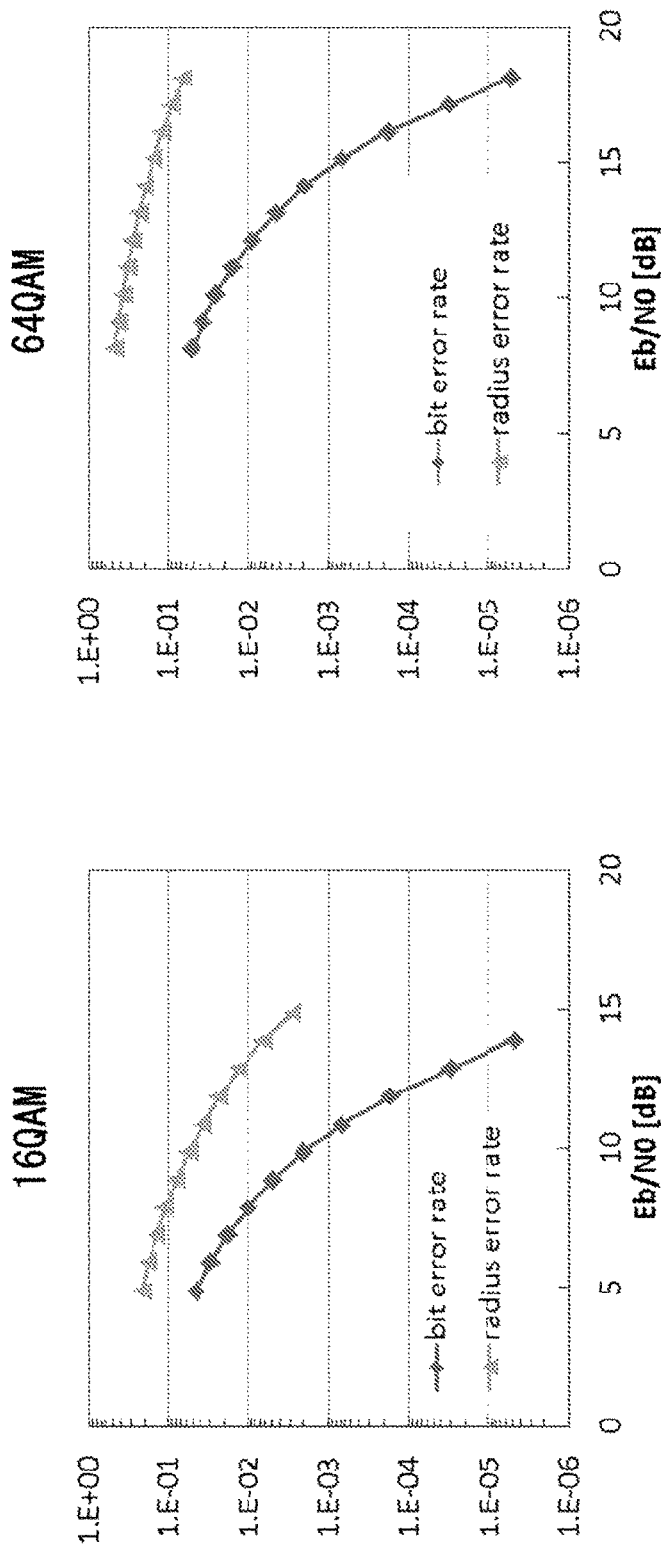
FIGS. 5A and 5B illustrate examples of a relationship between a modulation format and an error rate.

FIGS. 5A and 5B illustrate examples of a relationship between a modulation format and an error rate. The error rates (a bit error rate and an amplitude decision error rate) are calculated by a Monte Carlo simulation.

FIG. 5A illustrates a simulation result about 16 QAM. In this example, when the bit error rate is about $10^{-2}$, the probability that an amplitude decision error will occur is about 10 percent. FIG. 5B illustrates a simulation result about 64 QAM. In this example, when the bit error rate is about $10^{-2}$, the probability that an amplitude decision error will occur is about 30 percent.

As described above, when the multi-value level of a modulation format is higher, the estimation accuracy of an amplitude/phase of a received symbol is lower, so the estimation accuracy of a compensation value used for compensating for an electric field information signal in a compensator is also lower. In other words, the estimation accuracy of a compensation value used for compensating for an electric field information signal in a compensator is higher when a modulation format with a low multi-value level is used than when a modulation format with a high multi-value level is used.

Thus, when the modulation format of an H polarization and the modulation format of a V polarization in a received polarization multiplexed optical signal are different from each other, the digital signal processor 1 according to the embodiments of the present invention selects one of the polarizations according to the priority determined in advance for each modulation format. For example, a polarization component with a lower multi-value level is selected. Then, based on an electric field information signal of the selected polarization component, the digital signal processor 1 generates a compensation value for compensating for the electric field information signal of the selected polarization component, so as to compensate for electric field information signals of both of the polarization components using the compensation value. This compensation method may be applied to an estimation of a filter coefficient to separate polarizations from each other, an estimation of a frequency offset, an estimation of a phase error, and an estimation of a polarization crosstalk.

The reason why a compensation value obtained using one of the polarization components can be used for the other polarization component is as follows. Both of the polarization components in a polarization multiplexed optical signal are generated using the same light source, so the optical frequencies of the respective polarization components are the same, and the optical phases of the respective polarization components are also the same. Therefore, a frequency offset and a phase error that are to be compensated for at an optical receiver are the same between polarizations. Further, there is a known relationship between polarizations in the filter coefficient for a polarization separation. Thus, it is possible to calculate or estimate filter coefficients used for one of the polarization components from filter coefficients used for the other polarization component.

There is a possibility that an optical phase relationship between polarizations will lose a balance in an optical transmission link in which phase noise due to polarization mode dispersion or non-linear optical effects is severe. However, if a plurality of compensation values obtained from a plurality of symbols received at different times are averaged, an estimated error due to phase noise will be suppressed.

FIGS. 6A, 6B, 7A and 7B are block diagrams that illustrate functions of a compensator that compensates for an input signal. A compensator 10 illustrated in FIGS. 6A, 6B, 7A and 7B corresponds to the adaptive equalizer 3, the frequency offset compensator 4, the carrier phase recovery 5, or the non-linear polarization crosstalk canceller 6. A signal $r_h$ represents a phase and an amplitude of an H polarization, and a signal $r_v$ represent a phase and an amplitude of a V polarization. Thus, each of the signals $r_h$ and $r_v$ is constituted of, for example, an I-component signal and a Q-component signal.

In the example illustrated in FIG. 6A, an electric field information signal is compensated for with a feedforward control. The compensator 10 includes a compensation value calculator 11, a modulation format scheduler 12, a selector 13, and a compensation circuit 14. The compensation value calculator 11 generates a compensation value $Coeff_h$ and a compensation value $Coeff_v$ based on an input signal $[r_h, r_v]$. Here, the compensation value calculator 11 generates a corresponding compensation value for each polarization component. In other words, the compensation value $Coeff_h$ is generated based on an input signal $r_h$, and the compensation value $Coeff_v$ is generated based on an input signal $r_v$.

The modulation format scheduler 12 has modulation format information that indicates a modulation format of an optical signal transmitted in each polarization component. The modulation format information is, for example, generated by a network management system and provided to the modulation format scheduler 12, although it is not particularly limited to this configuration. Alternatively, the modulation format information may be generated according to a negotiation between a transmission node and a reception node. Then, the modulation format scheduler 12 provides the modulation format information to the selector 13.

The selector 13 has a polarization selecting function that selects an H polarization or a V polarization according to the modulation format information provided by the modulation format scheduler 12. The selector 13 outputs a compensation value that corresponds to a selected polarization component. In other words, the selector 13 selects the compensation value $Coeff_h$ or the compensation value $Coeff_v$ according to the modulation format information. Here, the selector 13 may select a polarization component in which a modulation format with a lower multi-value level is used. For example, when the H polarization and the V polarization respectively transmit a QPSK-modulated optical signal and a 16 QAM-modulated optical signal, the compensation value $Coeff_h$ generated based on the signal $r_h$ of the H polarization is selected. In FIGS. 6A, 6B, 7A and 7B, h/v represents an H polarization component or a V polarization component. In other words, $Coeff_{h/v}$ represents the compensation value $Coeff_h$ or the compensation value $Coeff_v$.

The compensation circuit 14 compensates for a signal of an H polarization and a signal of a V polarization using a compensation value selected by the selector 13. In other words, when the compensation value $Coeff_h$ is selected, the compensation circuit 14 compensates for the signal $r_h$ and the signal $r_v$ using the compensation value $Coeff_h$. On the other hand, when the compensation value $Coeff_v$ is selected, the compensation circuit 14 compensates for the signal $r_h$ and the signal $r_v$ using the compensation value $Coeff_v$.

In the example illustrated in FIG. 6B, an electric field information signal is compensated for with a feedback control. Also in this case, the compensator 10 includes the compensation value calculator 11, the modulation format scheduler 12, the selector 13, and the compensation circuit 14. However, in the case illustrated in FIG. 6B, the compensation value calculator 11 generates the compensation value $Coeff_h$ and the compensation value $Coeff_v$ based on a signal that is compensated for by the compensation circuit 14.

In the example illustrated in FIG. 7A, a signal $r_h$ and a signal $r_v$ are input to the selector 13. Then, the selector 13 selects an H polarization or a V polarization according to modulation format information provided by the modulation format scheduler 12, and outputs a signal corresponding to the selected polarization component. In other words, the selector 13 selects the signal $r_h$ or the signal $r_v$ according to the modulation format information. Here, the selector 13 may select a polarization component in which a modulation format with a lower multi-value level is used. For example, when the H polarization and the V polarization respectively transmit a QPSK-modulated optical signal and a 16 QAM-modulated optical signal, the signal $r_h$ is selected.

The compensation value calculator 11 generates a corresponding compensation value based on the signal selected by the selector 13. In other words, the compensation value calculator 11 generates the compensation value $Coeff_h$ when the signal $r_h$ is selected, and generates the compensation value $Coeff_v$ when the signal $r_v$ is selected. Then, the compensation circuit 14 compensates for the signal $r_h$ and the signal $r_v$ using a compensation value output from the compensation value calculator 11.

As illustrated in FIGS. 6A, 6B, and 7A, the compensation value calculator 11 and the selector 13 generate a compensation value for compensating for an electric field information signal of a polarization component selected according to modulation format information. Then, the compensation circuit 14 compensates for electric field information signals of two polarizations using this compensation value.

In the example illustrated in FIG. 7B, the compensator 10 includes a modulation format decision unit 15 instead of the modulation format scheduler 12 described above. The modulation format decision unit 15 decides a modulation format according to electric field information on a received signal. In other words, the modulation format decision unit 15 decides a modulation format of an optical signal of an H polarization according to a received signal $r_h$, and decides a modulation format of an optical signal of a V polarization according to a received signal $r_v$. A method for deciding a modulation format according to electric field information on a received signal is disclosed in, for example, Syed Muhammad Bilal et al, Blind modulation format identification for digital coherent receivers, Optics Express vol. 23, No. 20, pp. 26769-26778.

The modulation format decision unit 15 generates modulation format information that indicates a modulation format decided in each polarization component. The selector 13 selects an H polarization or a V polarization according to this modulation format information and outputs a compensation value corresponding to the selected polarization component. Then, the compensation circuit 14 compensates for the signal $r_h$ and the signal $r_v$ using the compensation value selected by the selector 13.

Any combination of the configurations illustrated in FIGS. 6A to 7B is acceptable. In other words, a control system may be any of a feedforward system, a feedback system, and a combination of the feedforward system and the feedback system. The selector 13 may select a compensation value (Coeff$_h$/Coeff$_v$) on the output side of the compensation value calculator 11, and may select a signal (r$_h$/r$_v$) on the input side of the compensation value calculator 11. Information that indicates a modulation format of each polarization component may be stored in the modulation format scheduler 12 in advance, or the modulation format decision unit 15 may estimate a modulation format of each polarization component.

FIGS. 8A and 8B illustrate examples of a configuration of a digital signal processor included in an optical receiver. FIG. 8A illustrates a configuration in which the modulation format scheduler 12 is included. In this configuration, the modulation format scheduler 12 provides modulation format information to each of the adaptive equalizer (AEQ) 3, the frequency offset compensator (FOC) 4, the carrier phase recovery (CPR) 5, and the non-linear polarization crosstalk canceller (NPCC) 6. Then, the adaptive equalizer 3, the frequency offset compensator 4, the carrier phase recovery 5, and the non-linear polarization crosstalk canceller 6 respectively compensate for an input signal according to the provided modulation format information.

FIG. 8B illustrates a configuration in which the modulation format decision unit 15 is included. In this case, the modulation format decision unit 15 can obtain an electric field information signal from a desired tap point. In other words, the modulation format decision unit 15 decides a modulation format according to an output signal of the chromatic dispersion compensator (CDC) 2, the adaptive equalizer (AEQ) 3, the frequency offset compensator (FOC) 4, or the carrier phase recovery (CPR) 5.

Figure 9:
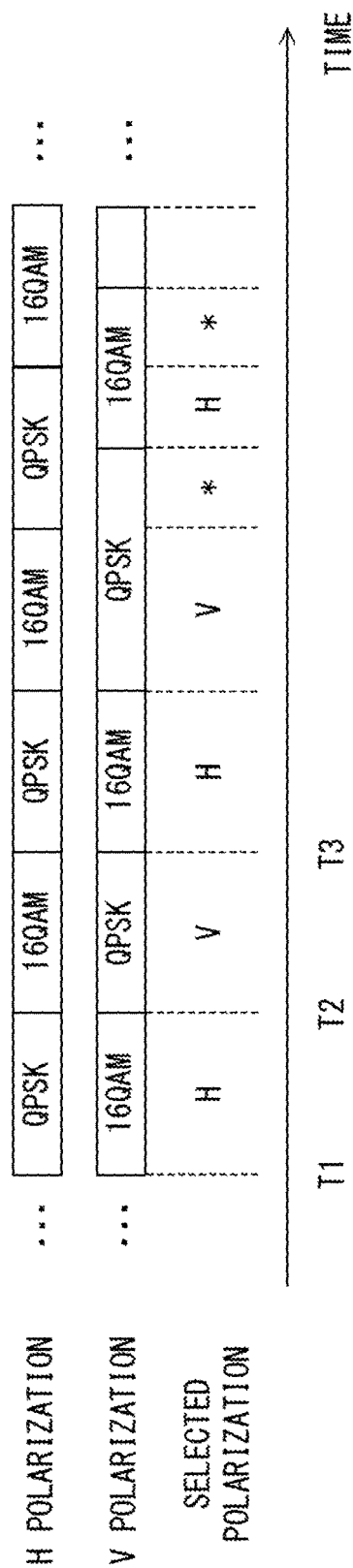
FIG. 9 is a timing chart of selecting a polarization.

FIG. 9 is a timing chart of selecting a polarization. In this example, a polarization multiplexed optical signal is transmitted by polarization/time-domain hybrid modulation in which QPSK and 16 QAM are used in each polarization component.

When the modulation format of an H polarization and the modulation format of a V polarization are different from each other, the selector 13 selects a polarization that transmits an optical signal by a modulation format with a lower multi-value level. For example, during a time period between T1 and T2, a QPSK-modulated optical signal is transmitted by an H polarization, and a 16 QAM-modulated optical signal is transmitted by a V polarization. In this case, the selector 13 selects the H polarization. During a time period between T2 and T3, a QPSK-modulated optical signal is transmitted by the V polarization, and a 16 QAM-modulated optical signal is transmitted by the H polarization. In this case, the selector 13 selects the V polarization. Then, a compensation value that corresponds to the selected polarization is provided to the compensation circuit 14.

As described above, the signal processing device according to the embodiments of the present invention (the digital signal processor 1 in FIG. 3) estimates a compensation value for demodulation based on an electric field information signal of one of the polarization components in which a modulation format with a lower multi-value level is used, and compensates for electric field information signals of both of the polarization components using the compensation value. Thus, an accuracy of a compensation for a signal distortion is improved in both the H polarization and the V polarization.

As indicated by a mark * in FIG. 9, when the modulation format of an H polarization and the modulation format of a V polarization are the same, the compensator 10 performs one of the following processes.

(1) The compensator 10 compensates for a signal of an H polarization using a compensation value generated from the signal of the H polarization, and compensates for a signal of a V polarization using a compensation value generated from the signal of the V polarization. In this case, there is no need to perform selection, which results in reducing a power consumption of the selector 13.

(2) The compensation value calculator 11 calculates a compensation value based on the signal of one of the polarization components. The compensator 10 compensates for the signal of the H polarization and the signal of the V polarization using the calculated compensation value. In this case, a power consumption of the compensation value calculator 11 is reduced.

(3) The compensator 10 calculates an average of a compensation value generated by the signal of the H polarization and a compensation value generated by the signal of the V polarization, and compensates for the signal of the H polarization and the signal of the V polarization using this average. In this case, a compensation accuracy is improved.

As described above, when the modulation format of an H polarization and the modulation format of a V polarization are different, the selector 13 selects a polarization in which a modulation format with a lower multi-value level is used. However, a polarization is selected by another policy in the following exceptional cases.

(1) The case in which 8 QAM is used for one of the polarizations and 8 PSK is used for the other polarization (1a) The amplitude of an 8 PSK-modulated signal is constant. Thus, the 8 PSK-modulated signal may be equalized using an algorithm (such as CMA: constant modulus algorithm) suitable for a single amplitude signal. On the other hand, an 8 QAM-modulated signal may have two amplitudes. Thus, an amplitude-directed algorithm (such as RDE: radius-directed equalization) or a decision-directed algorithm (such as DD-LMS: decision-directed least mean square) will be needed in order to equalize a symbol of the 8 QAM-modulated signal. In these algorithms, there is a possibility that an amplitude decision error or a symbol decision error will occur, which may result in decreasing an accuracy of a compensation value. Thus, in the adaptive equalizer 3, the selector 13 selects a polarization component in which 8 PSK is used.

(1b) The phase of the 8 PSK-modulated signal may be estimated using an eighth power law. On the other hand, the phase of the 8 QAM-modulated signal may be estimated using a fourth power law. The phase estimation accuracy of the fourth power law is higher than that of the eighth power law. Thus, in the carrier phase recovery 5, the selector 13 selects a polarization component in which 8 QAM is used.

(2) The case in which BPSK is used for one of the polarizations and QPSK is used for the other polarization When a BPSK-modulated signal is equalized by CMA, mis-convergence may occur. Thus, when the CMA is used as an adaptive equalization algorithm, in the adaptive equalizer 3, the selector 13 selects a polarization component in which QPSK is used.

<Adaptive Equalizer>

Figure 10:
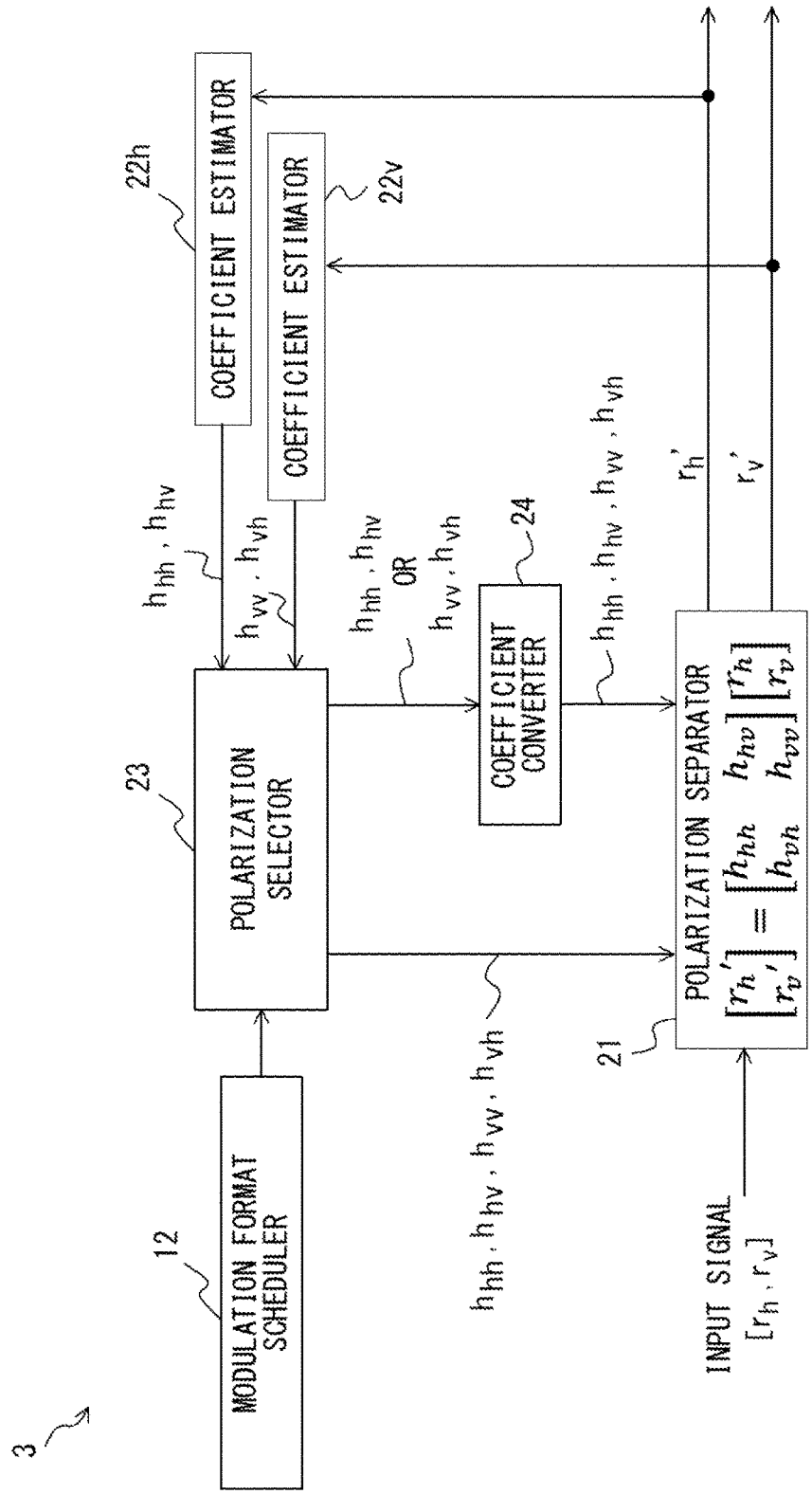
FIG. 10 illustrates an example of an adaptive equalizer.

FIG. 10 illustrates an example of the adaptive equalizer 3. In FIG. 10, an input signal [r$_h$, r$_v$] is generated by the chromatic dispersion compensator 2. Further, an output signal [r$_h$', r$_v$'] is obtained by separating a polarization with respect to the input signal [r$_h$, r$_v$].

The adaptive equalizer 3 includes a polarization separator 21, coefficient estimators 22h and 22v, a polarization selector 23, and a coefficient converter 24. The polarization separator 21 (and the coefficient converter 24) corresponds to the compensation circuit 14 illustrated in FIGS. 6A to 7B. The coefficient estimators 22h and 22v correspond to the compensation value calculator 11. The polarization selector 23 corresponds to the selector 13.

In this example, the polarization separator 21 separates polarizations from each other using a Jones matrix. In other words, the polarization separator 21 separates polarizations from each other using Formula (1).

$$\begin{bmatrix} r'_h \\ r'_v \end{bmatrix} = \begin{bmatrix} h_{hh} & h_{hv} \\ h_{vh} & h_{vv} \end{bmatrix} \begin{bmatrix} r_h \\ r_v \end{bmatrix} \quad (1)$$

A V-polarization component is removed from a signal $r_h$ by performing this calculation. The V-polarization component removed from the signal $r_h$ is added to a signal $r_v$. Likewise, an H-polarization component is removed from the signal $r_v$. The H-polarization component removed from the signal $r_v$ is added to the signal $r_h$.

The coefficient estimators 22h and 22v respectively estimate Jones matrix coefficients based on output signals of corresponding polarizations. In other words, the coefficient estimator 22h estimates coefficients $h_{hh}$ and $h_{hv}$ based on the signal $r_h'$ output from the polarization separator 21. The coefficients $h_{hh}$ and $h_{hv}$ are used for compensating for a signal of an H polarization, as represented in Formula (1). Likewise, the coefficient estimator 22v estimates coefficients $h_{vv}$ and $h_{vh}$ based on the signal $r_v'$ output from the polarization separator 21. The coefficients $h_{vv}$ and $h_{vh}$ are used for compensating for a signal of a V polarization, as represented in Formula (1).

The estimation of Jones matrix coefficients is realized by, for example, the following algorithms.
(1) CMA: Constant Modulus Algorithm
(2) RDE: Radius-Directed Equalization
(3) LMS: Least Mean Square algorithm The polarization selector 23 selects an H polarization or a V polarization according to modulation format information provided by the modulation format scheduler 12, and outputs coefficients that correspond to the selected polarization component. In other words, the polarization selector 23 selects the coefficients $h_{hh}$ and $h_{hv}$ or the coefficients $h_{vv}$ and $h_{vh}$ according to the modulation format information. The coefficients $h_{hh}$ and $h_{hv}$ correspond to the compensation value Coeff$_h$ illustrated in FIGS. 6A to 7B, and the coefficients $h_{vv}$ and $h_{vh}$ correspond to the compensation value Coeff$_v$. Here, except for the exceptional cases described above, the polarization selector 23 selects a polarization component in which a modulation format with a lower multi-value level is used. For example, when the H polarization and the V polarization respectively transmit a QPSK-modulated optical signal and a 16 QAM-modulated optical signal, the coefficients $h_{hh}$ and $h_{hv}$ generated from a signal of the H polarization are selected. Then, the coefficients selected by the polarization selector 23 are provided to the coefficient converter 24.

The coefficient converter 24 generates coefficients that correspond to the other polarization component from the coefficients that correspond to the polarization component selected by the polarization selector 23. For example, when the modulation format information indicates H polarization and the coefficients $h_{hh}$ and $h_{hv}$ are selected by the polarization selector 23, the coefficient converter 24 generates the coefficients $h_{vv}$ and $h_{vh}$ based on the coefficients $h_{hh}$ and $h_{hv}$. Here, the Jones matrix is a unitary matrix. Thus, the coefficient converter 24 can generate coefficients that correspond to one of the polarization components from coefficients that correspond to the other polarization component using Formula (2). The symbol * represents a Hermitian transpose.

$$\begin{bmatrix} 1 & 0 \\ 0 & 1 \end{bmatrix} = \begin{bmatrix} h_{hh} & h_{hv} \\ h_{vh} & h_{vv} \end{bmatrix} \begin{bmatrix} h_{hh} & h_{hv} \\ h_{vh} & h_{vv} \end{bmatrix}^* \quad (2)$$

$$h_{hh} = \sqrt{1 - |h_{vh}|^2}$$

$$h_{vv} = \sqrt{1 - |h_{hv}|^2}$$

$$h_{hh}^* h_{hv} = -h_{vv} h_{vh}^*$$

The coefficients selected by the polarization selector 23 and the coefficients generated by the coefficient converter 24 are provided to the polarization separator 21. In other words, the polarization separator 21 obtains the coefficients $h_{hh}$, $h_{hv}$, $h_{vv}$, and $h_{vh}$. Then, the polarization separator 21 separates the polarizations from each other by performing a matrix operation that uses these coefficients.

As described above, the adaptive equalizer 3 separates the polarizations from each other using coefficients estimated from a polarization component that transmits an optical signal in which a modulation format with a lower multi-value level is used. Here, an accuracy of coefficients estimated from a signal in which a modulation format with a lower multi-value level is used is higher, compared to the case in which a modulation format with a higher multi-value level is used. In other words, the adaptive equalizer 3 can separate polarizations from each other using coefficients whose estimation accuracy is high. This realizes an accurate polarization separation.

When there is a great polarization dependent loss (PDL) in an optical transmission link, there is a possibility that a Jones matrix will not be a unitary matrix. Thus, when it is possible to estimate a polarization dependent loss, the adaptive equalizer 3 may correct the converted coefficients generated by the coefficient converter 24 with the estimated polarization dependent loss.

When the modulation format of the H polarization and the modulation format of the V polarization are the same as each other, the polarization selector 23 guides the coefficients $h_{hh}$ and $h_{hv}$ generated by the coefficient estimator 22h and the coefficients $h_{vv}$ and $h_{vh}$ generated by the coefficient estimator 22v to the polarization separator 21. Then, the polarization separator 21 separates polarizations from each other using these coefficients. Further, in the exceptional cases described above, the polarization selector 23 selects coefficients that correspond to a polarization specified in advance. Furthermore, when the digital signal processor 1 includes the modulation format decision unit 15 instead of the modulation format scheduler 12, the polarization selector 23 selects coefficients according to modulation format information provided by the modulation format decision unit 15.

Figure 11:
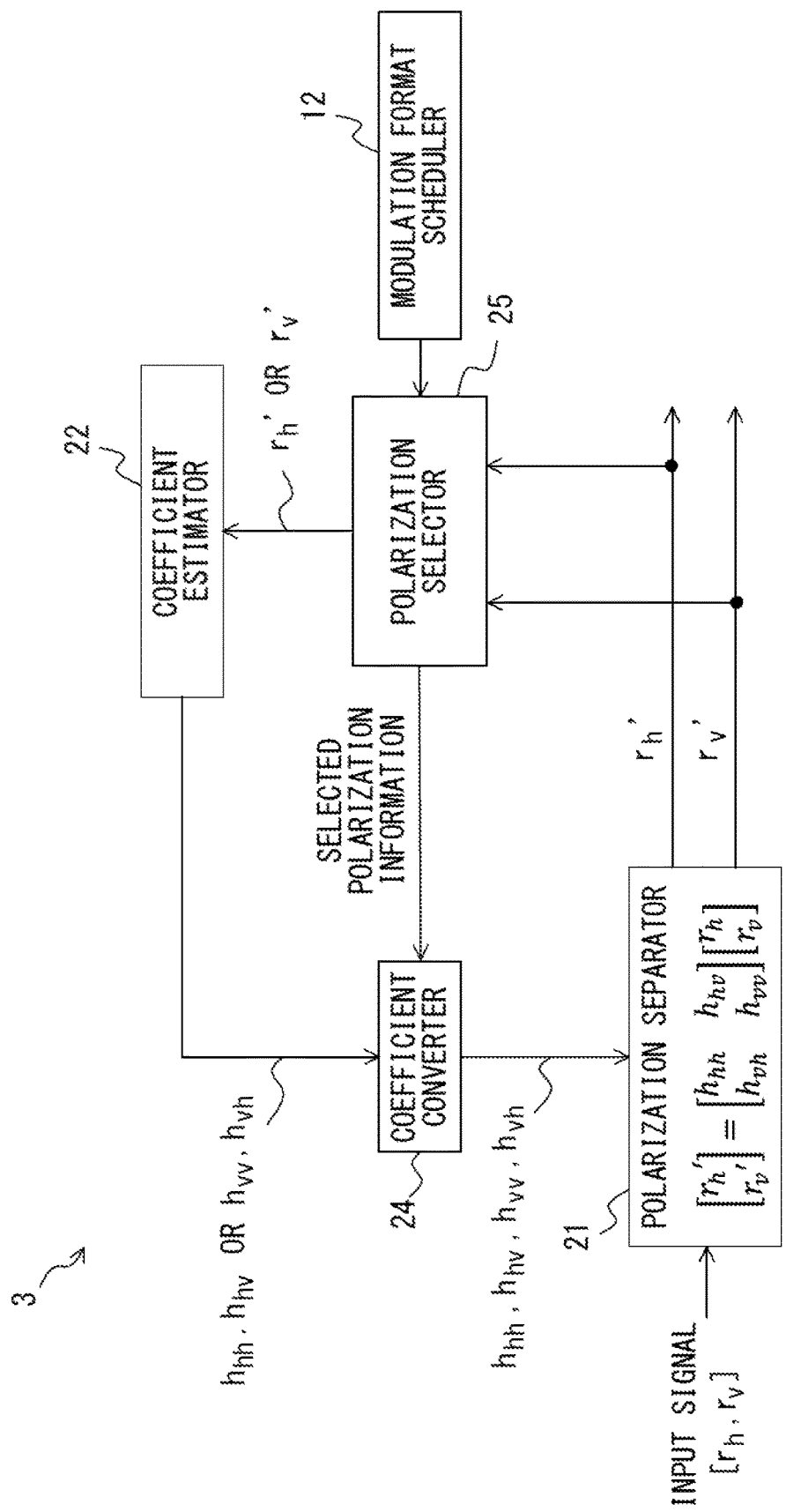
FIG. 11 illustrates another example of the adaptive equalizer.

FIG. 11 illustrates another example of the adaptive equalizer 3. In the example illustrated in FIG. 10, after all coefficients are estimated, coefficients corresponding to one of the polarization components are selected. On the other hand, in the example illustrated in FIG. 11, one of the polarization components is selected, and coefficients that correspond to the selected polarization component are then estimated.

The adaptive equalizer 3 includes the polarization separator 21, a coefficient estimator 22, the coefficient converter 24, and a polarization selector 25. The polarization separator 21 is substantially the same in FIGS. 10 and 11. The coefficient estimator 22 corresponds to the compensation value calculator 11 illustrated in FIGS. 6A to 7B. The polarization selector 25 corresponds to the selector 13.

The polarization selector 25 selects an H polarization or a V polarization according to modulation format information provided by the modulation format scheduler 12, and guides a signal that corresponds to the selected polarization component to the coefficient estimator 22. In other words, the polarization selector 25 guides a signal $r_h'$ or a signal $r_v'$ to the coefficient estimator 22 according to the modulation format information. Here, except for the exceptional cases described above, the polarization selector 25 selects a polarization component in which a modulation format with a lower multi-value level is used. Further, the polarization selector 25 provides selected polarization information that indicates a selected polarization component to the coefficient converter 24.

The coefficient estimator 22 estimates Jones matrix coefficients based on the signal provided by the polarization selector 25. In other words, the coefficient estimator 22 generates coefficients $h_{hh}$ and $h_{hv}$ when the signal $r_h'$ is given. The coefficient estimator 22 generates coefficients $h_{vv}$ and $h_{vh}$ when the signal $r_v'$ is given.

Based on the selected polarization information, the coefficient converter 24 generates coefficients that correspond to the other polarization component from the coefficients generated by the coefficient estimator 22. The calculation performed by the coefficient converter 24 is substantially the same in FIGS. 10 and 11. In other words, the coefficient converter 24 generates coefficients that correspond to one of the polarization components from coefficients that correspond to the other polarization component, using the fact that the Jones matrix is a unitary matrix. Then, the polarization separator 21 separates polarizations from each other using the coefficients $h_{hh}$, $h_{hv}$, $h_{vv}$, and $h_{vh}$.

When the modulation format of the H polarization and the modulation format of the V polarization are the same as each other, the polarization selector 25 guides the signals $r_h'$ and $r_v'$ output from the polarization separator 21 to the coefficient estimator 22. The coefficient estimator 22 generates the coefficients $h_{hh}$, $h_{hv}$, $h_{vv}$, and $h_{vh}$ based on these signals. Then, the polarization separator 21 separates polarizations from each other using these coefficients. Further, in the exceptional cases described above, the polarization selector 25 selects coefficients that correspond to a polarization specified in advance. Furthermore, when the digital signal processor 1 includes the modulation format decision unit 15 instead of the modulation format scheduler 12, the polarization selector 25 selects a signal according to modulation format information provided by the modulation format decision unit 15.

<Frequency Offset Compensator>

Figure 12:
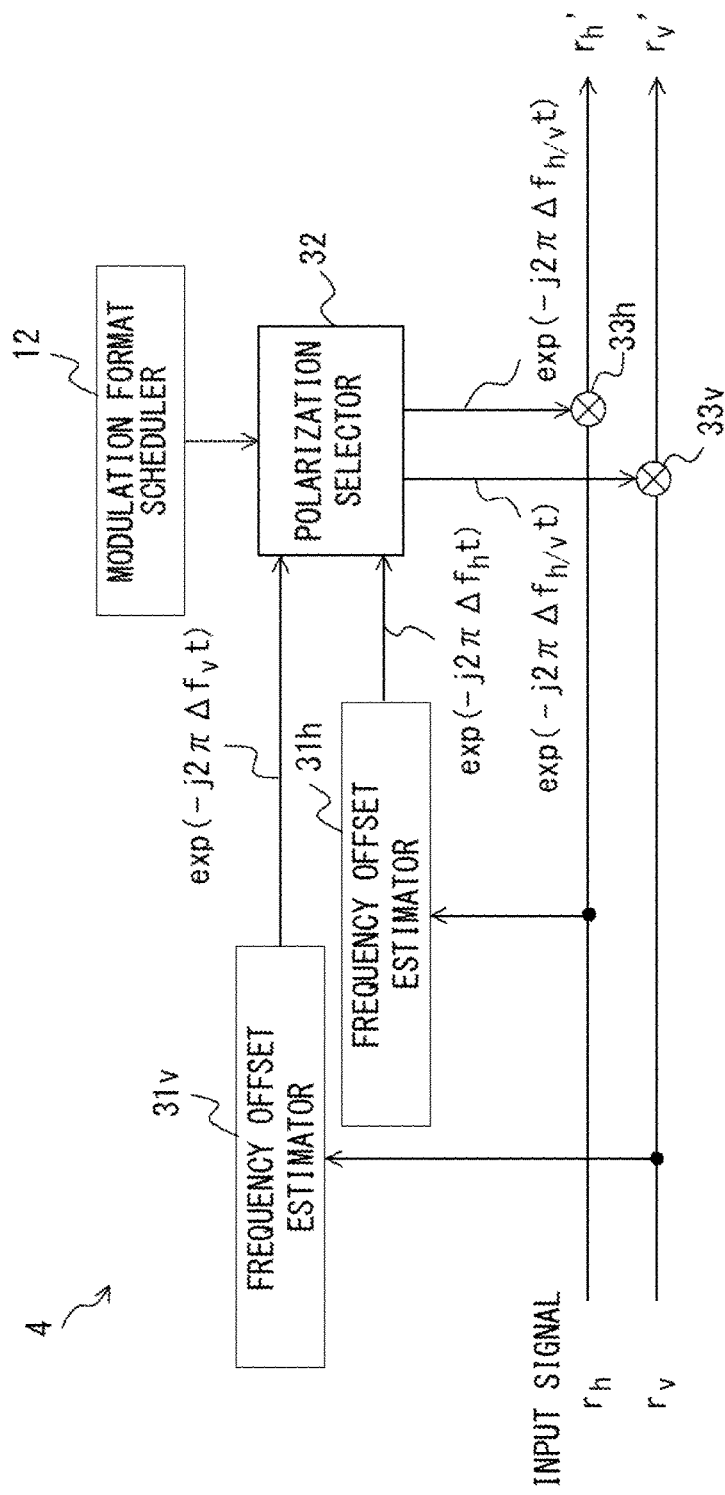
FIG. 12 illustrates an example of a frequency offset compensator.

FIG. 12 illustrates an example of the frequency offset compensator 4. In FIG. 12, input signals $r_h$ and $r_v$ are generated by the adaptive equalizer 3.

The frequency offset compensator 4 includes frequency offset estimators 31h and 31v, a polarization selector 32, and multipliers 33h and 33v. The frequency offset estimators 31h and 31v correspond to the compensation value calculator 11 illustrated in FIGS. 6A to 7B. The polarization selector 32 corresponds to the selector 13. The multipliers 33h and 33v correspond to the compensation circuit 14.

The frequency offset estimators 31h and 31v respectively estimate frequency offsets based on the input signals of corresponding polarization components. In other words, the frequency offset estimator 31h estimates a frequency offset $\Delta f_h$ based on the signal $r_h$, and calculates a compensation value $\exp(-j2\pi\Delta f_h t)$ from its estimated value. The frequency offset estimator 31v estimates a frequency offset $\Delta f_v$ based on the signal $r_v$, and calculates a compensation value $\exp(-j2\pi\Delta f_v t)$ from its estimated value. For example, the frequency offset is estimated using a PADE (pre-decision based angle differential estimator) algorithm.

The polarization selector 32 selects an H polarization or a V polarization according to modulation format information provided by the modulation format scheduler 12, and outputs a compensation value that corresponds to the selected polarization component. In other words, the polarization selector 32 selects $\exp(-j2\pi\Delta f_h t)$ or $\exp(-j2\pi\Delta f_v t)$ according to the modulation format information. The compensation value $\exp(-j2\pi\Delta f_h t)$ corresponds to the compensation value Coeff$_h$ illustrated in FIGS. 6A to 7B, and the compensation value $\exp(-j2\pi\Delta f_v t)$ corresponds to the compensation value Coeff$_v$. The polarization selector 32 selects a polarization component in which a modulation format with a lower multi-value level is used. For example, when the H polarization and the V polarization respectively transmit a QPSK-modulated optical signal and a 16 QAM-modulated optical signal, the compensation value $\exp(-j2\pi\Delta f_h t)$ is selected. Then, the compensation value selected by the polarization selector 32 is provided to the multipliers 33h and 33v.

In FIG. 12, $\exp(-j2\pi\Delta f_{h/v} t)$ provided to the multipliers 33h and 33v represents a compensation value that corresponds a polarization component selected by the polarization selector 32. In other words, when the H polarization is selected by the polarization selector 32, $\exp(-j2\pi\Delta f_{h/v} t)$ represents the compensation value $\exp(-j2\pi\Delta f_h t)$. When the V polarization is selected, $\exp(-j2\pi\Delta f_{h/v} t)$ represents the compensation value $\exp(-j2\pi\Delta f_v t)$.

The multipliers 33h and 33v respectively compensate for frequency offsets of corresponding signals using a provided compensation value. In other words, the multiplier 33h shifts the frequency of the signal $r_h$ by $\Delta f_{h/v}$ by multiplying the signal $r_h$ by the compensation value $\exp(-j2\pi\Delta f_{h/v} t)$. Likewise, the multiplier 33v shifts the frequency of the signal $r_v$ by $\Delta f_{h/v}$ by multiplying the signal $r_v$ by the compensation value $\exp(-j2\pi\Delta f_{h/v} t)$. The frequency offset of each polarization component is compensated for by performing this calculation.

As described above, the frequency offset compensator 4 compensates for frequency offsets of two polarizations using a frequency offset estimated from one of the polarizations that transmits an optical signal in which a modulation format with a lower multi-value level is used. Here, an accuracy of a frequency offset estimated from a signal in which a modulation format with a lower multi-value level is used is higher, compared to the case in which a modulation format with a higher multi-value level is used. In other words, in the frequency offset compensator 4, frequency offsets of two polarizations are compensated for using a compensation value whose estimation accuracy is high, which results in accurately compensating for the frequency offset of each polarization component.

When the modulation format of the H polarization and the modulation format of the V polarization are the same as each other, the polarization selector 32 guides the compensation value $\exp(-j2\pi\Delta f_h t)$ generated by the frequency offset estimator 31h to the multiplier 33h, and guides the compensation value $\exp(-j2\pi\Delta f_v t)$ generated by the frequency offset estimator 31v to the multiplier 33v. The polarization selector 32 may provide an average of $\exp(-j2\pi\Delta f_h t)$ and $\exp(-j2\pi\Delta f_v t)$ to the multipliers 33h and 33v.

In the example illustrated in FIG. 12, a frequency offset is compensated for with a feedforward control, but the frequency offset compensator 4 may compensate for a frequency offset with a feedback control. Further, when the digital signal processor 1 includes the modulation format decision unit 15 instead of the modulation format scheduler 12, the polarization selector 32 selects a compensation value according to modulation format information provided by the modulation format decision unit 15.

Figure 13:
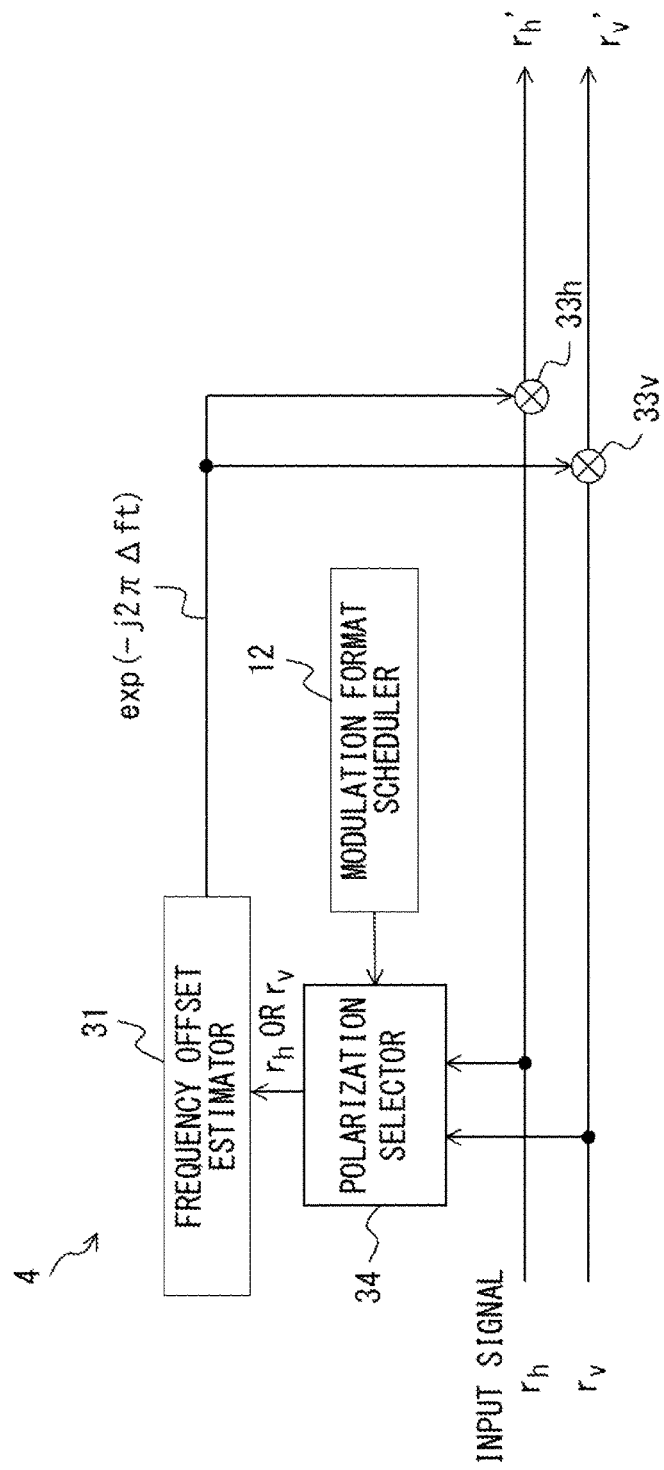
FIG. 13 illustrates another example of the frequency offset compensator.

FIG. 13 illustrates another example of the frequency offset compensator 4. In the example illustrated in FIG. 12, after compensation values that respectively correspond to two polarization components are estimated, one of the compensation values is selected. On the other hand, in the example illustrated in FIG. 13, one of the polarization components is selected, and a compensation value that corresponds to the selected polarization component is then estimated.

The frequency offset compensator 4 includes a frequency offset estimator 31, the multipliers 33h and 33v, and a polarization selector 34. The multipliers 33h and 33v are substantially the same in FIGS. 12 and 13. The frequency offset estimator 31 corresponds to the compensation value calculator 11 illustrated in FIGS. 6A to 7B. The polarization selector 34 corresponds to the selector 13.

The polarization selector 34 selects an H polarization or a V polarization according to modulation format information provided by the modulation format scheduler 12, and guides a signal that corresponds to the selected polarization component to the frequency offset estimator 31. In other words, the polarization selector 34 guides a signal $r_h$ or a signal $r_v$ to the frequency offset estimator 31 according to the modulation format information. Here, the polarization selector 34 selects a polarization component in which a modulation format with a lower multi-value level is used.

The frequency offset estimator 31 estimates a frequency offset $\Delta f$ based on the signal provided by the polarization selector 34, and calculates a compensation value $\exp(-j2\pi\Delta ft)$ from its estimated value. This compensation value is provided to the multipliers 33h and 33v. Then, the multipliers 33h and 33v respectively compensate for frequency offsets of the signals $r_h$ and $r_v$ using the respectively provided compensation values.

When the modulation format of the H polarization and the modulation format of the V polarization are the same as each other, the polarization selector 34 guides the input signals $r_h$ and $r_v$ to the frequency offset estimator 31. The frequency offset estimator 31 generates a compensation value $\exp(-j2\pi\Delta f_h t)$ based on the signal $r_h$, and generates a compensation value $\exp(-j2\pi\Delta f_v t)$ based on the signal $r_v$. Then, the multipliers 33h and 33v respectively compensate for frequency offsets using corresponding compensation values. Alternatively, the frequency offset estimator 31 may provide an average of two compensation values to the multipliers 33h and 33v.

In the example illustrated in FIG. 13, a frequency offset is compensated for with a feedforward control, but the frequency offset compensator 4 may compensate for a frequency offset with a feedback control. Further, when the digital signal processor 1 includes the modulation format decision unit 15 instead of the modulation format scheduler 12, the polarization selector 34 selects a compensation value according to modulation format information provided by the modulation format decision unit 15.

<Carrier Phase Recovery>

Figure 14:
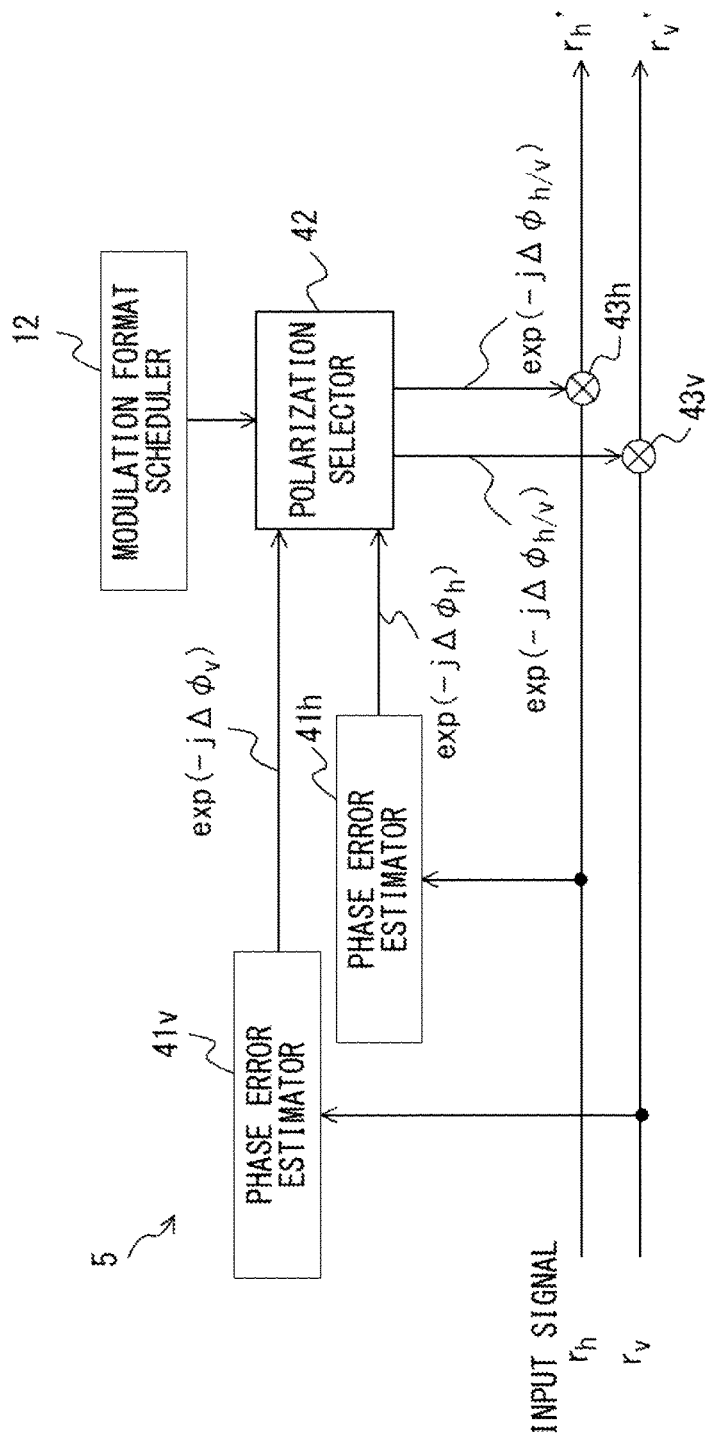
FIG. 14 illustrates an example of a carrier phase recovery.

FIG. 14 illustrates an example of the carrier phase recovery 5. In FIG. 14, input signals $r_h$ and $r_v$ are generated by the frequency offset compensator 4.

The carrier phase recovery 5 includes phase error estimators 41h and 41v, a polarization selector 42, and multipliers 43h and 43v. The phase error estimators 41h and 41v correspond to the compensation value calculator 11 illustrated in FIGS. 6A to 7B. The polarization selector 42 corresponds to the selector 13. The multipliers 43h and 43v correspond to the compensation circuit 14.

The phase error estimators 41h and 41v respectively estimate phase errors based on input signals of corresponding polarization components. In other words, the phase error estimator 41h estimates a phase error $\Delta\phi_h$ based on the signal $r_h$ and calculates a compensation value $\exp(-j\Delta\phi_h)$ from its estimated value. Likewise, the phase error estimator 41v estimates a phase error $\Delta\phi_v$ based on the signal $r_v$ and calculates a compensation value $\exp(-j\Delta\phi_v)$ from its estimated value. The phase error is estimated using, for example, the following algorithms.

(1) Viterbi and Viterbi algorithm
(2) Blind phase search
(3) Digital PLL (phase lock loop)

The polarization selector 42 selects an H polarization or a V polarization according to modulation format information provided by the modulation format scheduler 12, and outputs a compensation value that corresponds to the selected polarization component. In other words, the polarization selector 42 selects $\exp(-j\Delta\phi_h)$ or $\exp(-j\Delta\phi_v)$ according to the modulation format information. The compensation value $\exp(-j\Delta\phi_h)$ corresponds to the compensation value $Coeff_h$ illustrated in FIGS. 6A to 7B, and the compensation value $\exp(-j\Delta\phi_v)$ corresponds to the compensation value $Coeff_v$. Here, except for the exceptional cases described above, the polarization selector 42 selects a polarization component in which a modulation format with a lower multi-value level is used. For example, when the H polarization and the V polarization respectively transmit a QPSK-modulated optical signal and a 16 QAM-modulated optical signal, the polarization selector 42 selects the compensation value $\exp(-j\Delta\phi_h)$. Then, the compensation value selected by the polarization selector 42 is provided to the multipliers 43h and 43v.

In FIG. 14, $\exp(-j\Delta\phi_{h/v})$ provided to the multipliers 43h and 43v represents a compensation value selected by the polarization selector 42. In other words, when the H polarization is selected by the polarization selector 42, $\exp(-j\Delta\phi_{h/v})$ represents the compensation value $\exp(-j\Delta\phi_h)$. When the V polarization is selected, $\exp(-j\Delta\phi_{h/v})$ represents the compensation value $\exp(-j\Delta\phi_v)$.

The multipliers 43h and 43v respectively compensate for phase errors of corresponding signals using the provided compensation value. A carrier phase is recovered by this compensation. Specifically, the multiplier 43h shifts the phase of the signal $r_h$ by $\Delta\phi_{h/v}$ by multiplying the signal $r_h$ by the compensation value $\exp(-j\Delta\phi_{h/v})$. Likewise, the multiplier 43v shifts the phase of the signal $r_v$ by $\Delta\phi_{h/v}$ by multiplying the signal $r_v$ by the compensation value $\exp(-j\Delta\phi_{h/v})$. A symbol phase of each polarization component is recovered by performing this calculation.

As described above, the carrier phase recovery 5 compensates for phase errors of two polarizations using a phase error estimated from one of the polarizations that transmits an optical signal in which a modulation format with a lower multi-value level is used. Here, an accuracy of a phase error estimated from a signal in which a modulation format with a lower multi-value level is used is higher, compared to the case in which a modulation format with a higher multi-value level is used. In other words, the carrier phase recovery 5 can recover a phase of each polarization using a compensation value whose estimation accuracy is high.

When the modulation format of the H polarization and the modulation format of the V polarization are the same as each other, the polarization selector 42 guides the compensation value exp(–jΔϕ$_h$) generated by the phase error estimator 41h to the multiplier 43h, and guides the compensation value exp(–jΔϕ$_v$) generated by the phase error estimator 41v to the multiplier 43v. Alternatively, the polarization selector 42 may provide an average of exp(–jΔϕ$_h$) and exp(–jΔϕ$_v$) to the multipliers 43h and 43v. Further, in the exceptional cases described above, the polarization selector 42 selects a compensation value that corresponds to a polarization specified in advance.

In the example illustrated in FIG. 14, a phase error is compensated for with a feedforward control, but the carrier phase recovery 5 may compensate for a phase error with a feedback control. Further, when the digital signal processor 1 includes the modulation format decision unit 15 instead of the modulation format scheduler 12, the polarization selector 42 selects a compensation value according to modulation format information provided by the modulation format decision unit 15.

Figure 15:
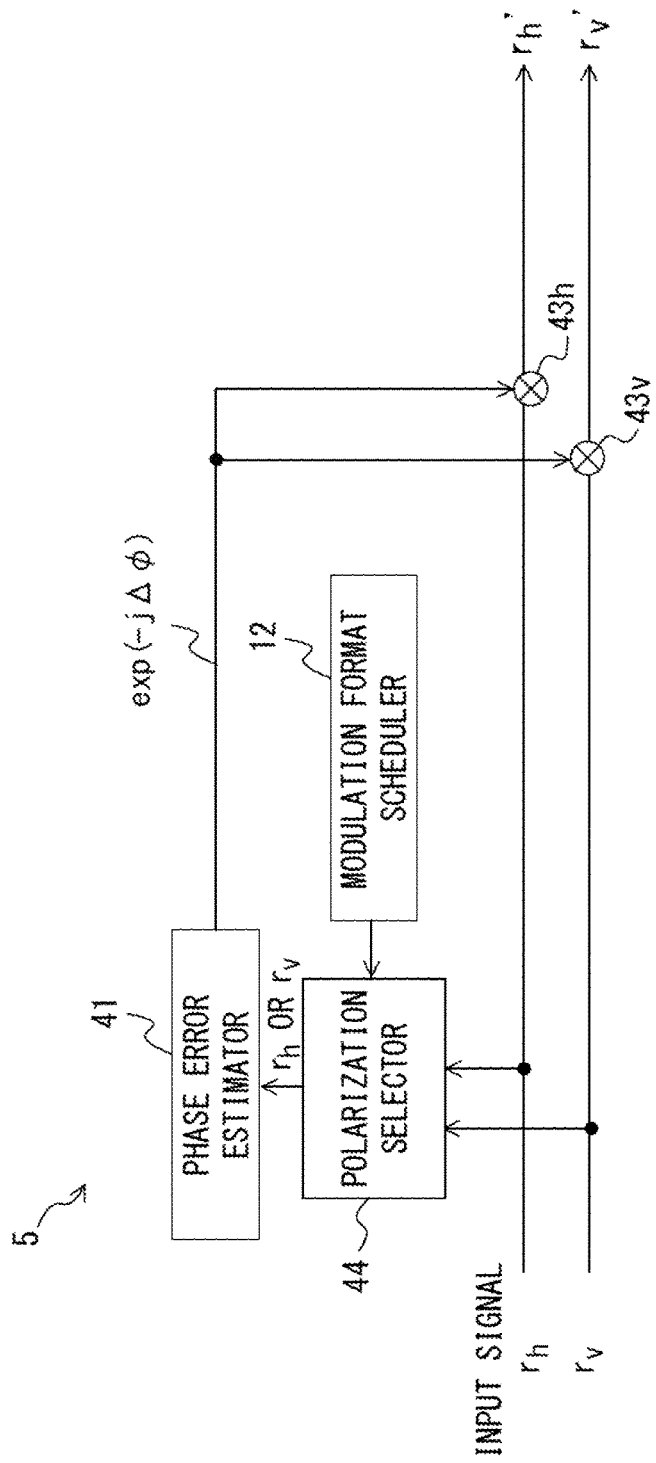
FIG. 15 illustrates another example of the carrier phase recovery.

FIG. 15 illustrates another example of the carrier phase recovery 5. In the example illustrated in FIG. 14, after compensation values that respectively correspond to two polarization components are estimated, one of the compensation values is selected. On the other hand, in the example illustrated in FIG. 15, one of the polarization components is selected, and a compensation value that corresponds to the selected polarization component is then estimated.

The carrier phase recovery 5 includes a phase error estimator 41, the multipliers 43h and 43v, and a polarization selector 44. The multipliers 43h and 43v are substantially the same in FIGS. 14 and 15. The phase error estimator 41 corresponds to the compensation value calculator 11 illustrated in FIGS. 6A to 7B. The polarization selector 44 corresponds to the selector 13.

The polarization selector 44 selects an H polarization or a V polarization according to modulation format information provided by the modulation format scheduler 12, and guides a signal that corresponds to the selected polarization component to the phase error estimator 41. In other words, the polarization selector 44 guides a signal $r_h$ or a signal $r_v$ to the phase error estimator 41 according to the modulation format information. Here, except for the exceptional cases described above, the polarization selector 44 selects a polarization component in which a modulation format with a lower multi-value level is used.

The frequency offset estimator 41 estimates a phase error Δϕ based on the signal provided by the polarization selector 44, and calculates a compensation value exp(–jΔϕ) from its estimated value. This compensation value is provided to the multipliers 43h and 43v. Then, the multipliers 43h and 43v respectively compensate for phase errors of the signals $r_h$ and $r_v$ using the respectively provided compensation values, so as to recover a symbol phase.

When the modulation format of the H polarization and the modulation format of the V polarization are the same as each other, the polarization selector 44 guides the input signals $r_h$ and $r_v$ to the frequency offset estimator 41. The frequency offset estimator 41 generates a compensation value exp(–jΔϕ$_h$) based on the signal $r_h$, and generates a compensation value exp(–jΔϕ$_h$) based on the signal $r_v$. Then, the multipliers 43h and 43v respectively compensate for phase errors using corresponding compensation values. Alternatively, the frequency offset estimator 41 may provide an average of the two compensation values to the multipliers 43h and 43v. Further, in the exceptional cases described above, the polarization selector 44 selects a signal that corresponds to a polarization specified in advance.

In the example illustrated in FIG. 15, a phase error is compensated for with a feedforward control, but the carrier phase recovery 5 may compensate for a phase error with a feedback control. Further, when the digital signal processor 1 includes the modulation format decision unit 15 instead of the modulation format scheduler 12, the polarization selector 44 selects a compensation value according to modulation format information provided by the modulation format decision unit 15.

<Non-Linear Polarization Crosstalk Canceller>

When a polarization multiplexed optical signal is transmitted through an optical fiber, a non-linear polarization crosstalk (NPC) may occur due to non-linear optical effects. A non-linear polarization crosstalk is one of the factors in degrading the signal characteristics and varies an optical power between polarizations due to non-linear optical effects in an optical fiber. Thus, a method for reducing a crosstalk between polarizations by performing digital signal processing is proposed.

The non-linear polarization crosstalk is represented by Formula (3). A matrix that represents a non-linear polarization crosstalk in Formula (3) may hereinafter be referred to as an "NPC matrix". $S_h$ and $S_v$ represent signals output from an optical transmitter, and $S_h'$ and $S_v'$ represent signals that arrive at an optical receiver.

$$\begin{bmatrix} s_h' \\ s_v' \end{bmatrix} = \begin{bmatrix} W_{hh} & W_{hv} \\ W_{vh} & W_{vv} \end{bmatrix} \begin{bmatrix} s_h \\ s_v \end{bmatrix} \qquad (3)$$

Here, coefficients in the NPC matrix have the following relationship.

$$W_{hh} = \sqrt{1 - |W_{vh}|^2} \qquad (4)$$
$$W_{vv} = \sqrt{1 - |W_{hv}|^2}$$
$$W_{hv} = -W_{vh}^*$$

Further, coefficients $W_{hv}$ and $W_{vh}$ that represent a crosstalk component are calculated using the following formula.

$$W_{hv} = \frac{r_h - \overline{r_h}}{\overline{r_v}} \quad W_{vh} = \frac{r_v - \overline{r_v}}{\overline{r_h}} \qquad (5)$$

$\overline{r_h}$ and $\overline{r_v}$ represent hard decision symbols of respective polarizations Thus, if a hard decision is respectively performed on an electric field information signal of an H polarization and an electric field information signal of a V polarization, crosstalk components of the NPC matrix will be obtained. Further, the other coefficients in the NPC matrix are also calculated based on the crosstalk components. In other words, the NPC matrix will be obtained.

The non-linear polarization crosstalk is cancelled by multiplying an input signal by an inverse matrix of an NPC matrix. In other words, a cancellation of the non-linear polarization crosstalk is realized by Formula (6). The "cancellation" includes reducing the non-linear polarization crosstalk.

$$\begin{bmatrix} r'_h \\ r'_v \end{bmatrix} = \begin{bmatrix} W_{hh} & W_{hv} \\ W_{vh} & W_{vv} \end{bmatrix}^{-1} \begin{bmatrix} r_h \\ r_v \end{bmatrix} \quad (6)$$

Figure 16:
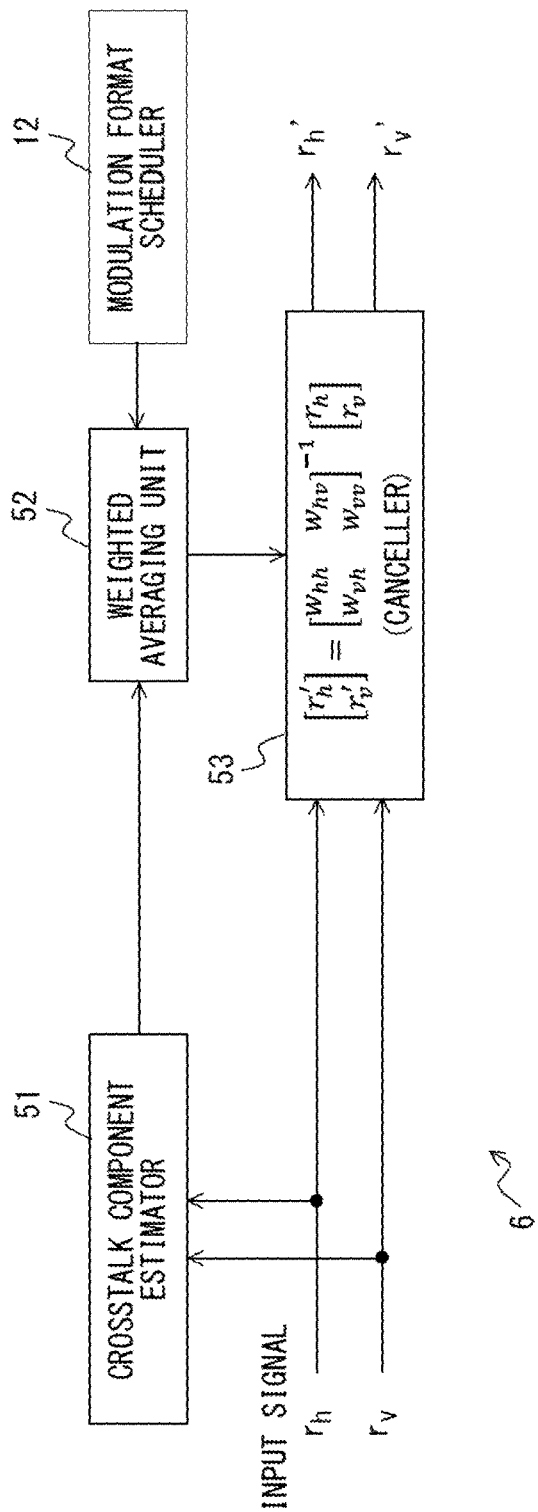
FIG. 16 illustrates an example of a non-linear polarization crosstalk canceller.

FIG. 16 illustrates an example of the non-linear polarization crosstalk canceller 6. In FIG. 16, input signals $r_h$ and $r_v$ are generated by the carrier phase recovery 5.

The non-linear polarization crosstalk canceller 6 includes a crosstalk component estimator 51, a weighted averaging unit 52, and a canceller 53. The crosstalk component estimator 51 corresponds to the compensation value calculator 11 illustrated in FIGS. 6A to 7B. The canceller 53 corresponds to the compensation circuit 14.

The crosstalk component estimator 51 calculates coefficients in an NPC matrix for each symbol based on input signals $r_h$ and $r_v$. In other words, coefficients $W_{hh}$, $W_{hv}$, $W_{vh}$, and $W_{vv}$ are calculated for each symbol.

According to modulation format information provided by the modulation format scheduler 12, the weighted averaging unit 52 calculates weighted averages of respective coefficients for a crosstalk component that are obtained by the crosstalk component estimator 51. The weighted average is calculated for, for example, a plurality of consecutive symbols. In this case, the weight corresponding to a symbol with a lower multi-value level is large, and a weight corresponding to a symbol with a higher multilevel is small.

Figure 17:
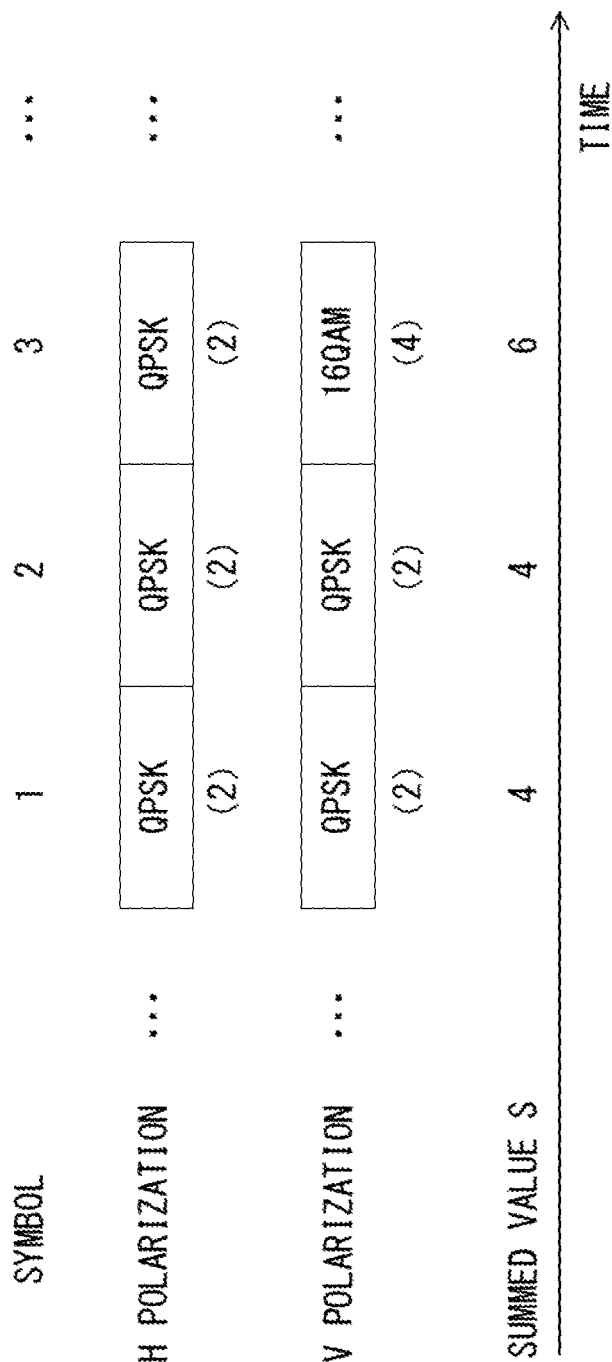
FIG. 17 illustrates an example of a weighted average of a crosstalk coefficient.

FIG. 17 illustrates an example of a weighted average of a crosstalk coefficient. In this example, a weighted average is calculated using three consecutive symbols. In an H polarization, a modulation format for symbols 1 to 3 is QPSK. In a V polarization, a modulation format for the symbols 1 and 2 is QPSK, and a modulation format for the symbol 3 is 16 QAM. Then, it is assumed that, as crosstalk components of the NPC matrix, coefficients $W_{hv1}$ and $W_{vh1}$ are calculated for the symbol 1, coefficients $W_{hv2}$ and $W_{vh2}$ are calculated for the symbol 2, and coefficients $W_{hv3}$ and $W_{vh3}$ are calculated for the symbol 3.

The weighted averaging unit 52 refers to a look-up table illustrated in FIG. 18, so as to determine a weight that corresponds to each symbol. In the look-up table, a corresponding weight is registered for a summed value S that is a sum of a multi-value level of a modulation format of an H polarization and a multi-value level of a modulation format of a V polarization. A weight is determined in advance by a simulation or an experiment such that the weight is higher if the summed value S of a multi-value level is smaller and the weight is lower if the summed value S of a multi-value level is larger.

In the example illustrated in FIG. 17, the summed values S of the symbols 1, 2, and 3 are "4", "4", and "6", respectively. Thus, weights "4.0", "4.0", and "3.0" are respectively obtained for the symbols 1, 2, and 3 by referring to the look-up table. Then, in order to obtain the coefficients $W_{hv}$ and $W_{vh}$ of the crosstalk components of the NPC matrix, the following calculations are performed.

$$W_{hv} = (4.0 * W_{hv1} + 4.0 * W_{hv2} + 3.0 * W_{hv3})/(4.0 + 4.0 + 3.0)$$

$$W_{vh} = (4.0 * W_{vh1} + 4.0 * W_{vh2} + 3.0 * W_{vh3})/(4.0 + 4.0 + 3.0)$$

The other coefficients in the NPC matrix (that is, $W_{hh}$ and $W_{vv}$) are calculated by, for example, providing the coefficients $W_{hv}$ and $W_{vh}$ obtained by the weighted average calculation described above to Formula (4). Then, the canceller 53 reduces a non-linear polarization crosstalk between the H polarization and the V polarization using an inverse matrix of the NPC matrix generated as described above.

In the cancellation processing described above, an estimation accuracy of a crosstalk component is high when a multi-value level of a modulation format of each polarization is low, and the estimation accuracy of a crosstalk component is low when the multi-value level of a modulation format of each polarization is high. Thus, an accuracy of a crosstalk component obtained by calculating a weighted average will be increased if a weight of a crosstalk component estimated from a symbol with a lower multi-value level is made high and a weight of a crosstalk component estimated from a symbol with a higher multi-value level is made low. This results in suppressing a non-linear polarization crosstalk accurately.

<Improvement in SNR>

The estimation accuracy of a compensation value used by a compensation circuit depends on a signal-to-noise ratio (SNR) of an input signal. Specifically, the estimation accuracy of a compensation value will be high if the SNR of an input signal is high.

Figure 19:
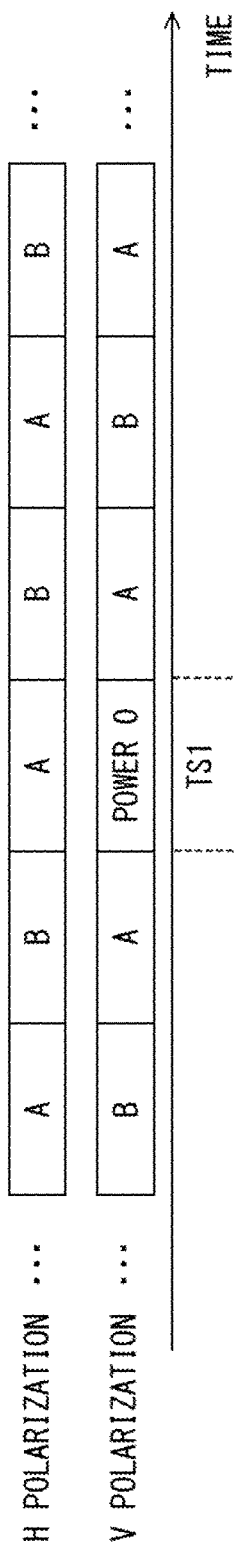
FIG. 19 illustrates an example of a method for improving an accuracy of a compensation value.

Thus, in one embodiment, an optical transmitter controls an optical power of an H-polarization component or a V-polarization component at zero in a specified estimation time slot. In the example illustrated FIG. 19, an optical power of the V-polarization component is controlled to be zero in an estimation time slot TS1. Here, the optical transmitter controls the optical powers of the H-polarization component and the V-polarization component such that an optical power of a polarization multiplexed optical signal is constant. For example, in the estimation time slot TS1, the amount of the optical power of the H-polarization component is controlled at twice its normal amount. This results in improving a SNR of the H-polarization component in the estimation time slot TS1. For example, the estimation time slot is inserted at time intervals specified in advance. A polarization component orthogonal to a polarization component whose optical power is controlled to be zero in the estimation time slot may hereinafter be referred to as an "estimated polarization".

An optical receiver compensates for an electric field information signal using an estimation time slot. Information that indicates a timing at which the estimation time slot is inserted is given to, for example, the modulation format scheduler 12. Alternatively, the modulation format decision unit 15 may detect the estimation time slot. Then, a compensator (the adaptive equalizer 3, the frequency offset compensator 4, and the carrier phase recovery 5) generates a compensation value in the estimation time slot based on a signal of the estimated polarization. Then, the compensator compensates for a signal of an H polarization and a signal of a V polarization using the generated compensation value. According to this method, an electric field information signal is compensated for using a compensation value generated according to a signal whose SNR is high, which results in improving an accuracy of a signal demodulation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A signal processing device that processes an electric field information signal indicating a polarization multiplexed optical signal in which different modulation formats are used, a first optical signal transmitted in a first polarization component and a second optical signal transmitted in a second polarization component that is orthogonal to the first polarization component being multiplexed in the polarization multiplexed optical signal, the signal processing device comprising:
a generator configured to select the first polarization component or the second polarization component based on a modulation format of the first optical signal and a modulation format of the second optical signal, and to generate a compensation value for compensating for an electric field information signal of a selected polarization component based on the electric field information signal of the selected polarization component; and
a compensation circuit configured to compensate for an electric field information signal of the first polarization component and an electric field information signal of the second polarization component using the compensation value generated by the generator.

2. The signal processing device according to claim 1, wherein
when the number of bits per symbol of a modulation format of the first polarization component is smaller than the number of bits per symbol of a modulation format of the second polarization component,
the generator generates a compensation value used for compensating for the electric field information signal of the first polarization component based on the electric field information signal of the first polarization component, and
the compensation circuit compensates for the electric field information signal of the first polarization component and the electric field information signal of the second polarization component using the compensation value generated by the generator.

3. The signal processing device according to claim 1, wherein
the generator estimates a phase error of the electric field information signal of the first polarization component when the first polarization component is selected, and
the compensation circuit compensates for the phase error estimated by the generator respectively in the electric filed information signal of the first polarization component and the electric field information signal of the second polarization component.

4. The signal processing device according to claim 1, wherein
the generator includes:
a selector configured to select the electric field information signal of the first polarization component or the electric field information signal of the second polarization component based on the modulation format of the first optical signal and the modulation format of the second optical signal; and
a compensation value calculator configured to calculate a compensation value used for compensating for the electric field information signal selected by the selector based on the electric field information signal selected by the selector, and wherein
the compensation circuit compensates for the electric field information signal of the first polarization component and the electric field information signal of the second polarization component using the compensation value calculated by the compensation value calculator.

5. The signal processing device according to claim 1, wherein
the compensation circuit is an adaptive equalizer that separates the first polarization component and the second polarization component from each other by a matrix operation, and
the generator includes:
a coefficient estimator configured to estimate a portion of coefficients for the matrix operation based on the electric field information signal of the first polarization component when the first polarization component is selected; and
a coefficient converter configured to calculate the other coefficients for the matrix operation based on the portion of the coefficients estimated by the coefficient estimator.

6. The signal processing device according to claim 1, wherein
the generator estimates a frequency offset based on the electric field information signal of the first polarization component when the first polarization component is selected, the frequency offset representing a difference between a frequency of a carrier of the polarization multiplexed optical signal and a frequency of a local light source for coherent detection of the polarization multiplexed optical signal, and
the compensation circuit compensates for the frequency offset estimated by the generator respectively in the electric field information signal of the first polarization component and the electric field information signal of the second polarization component.

7. A signal processing method for processing an electric field information signal indicating a polarization multiplexed optical signal in which different modulation formats are used, a first optical signal transmitted in a first polarization component and a second optical signal transmitted in a second polarization component that is orthogonal to the first polarization component being multiplexed in the polarization multiplexed optical signal, the signal processing method comprising:
selecting the first polarization component or the second polarization component based on a modulation format of the first optical signal and a modulation format of the second optical signal;
generating a compensation value for compensating for an electric field information signal of a selected polarization component based on the electric field information signal of the selected polarization component; and
compensating for an electric field information signal of the first polarization component and an electric field information signal of the second polarization component using the generated compensation value.

8. The signal processing method according to claim 7, wherein
when the number of bits per symbol of a modulation format of the first polarization component is smaller than the number of bits per symbol of a modulation format of the second polarization component,
the first polarization component is selected,
a compensation value used for compensating for the electric field information signal of the first polarization component is generated based on the electric field information signal of the first polarization component, and the electric field information signal of the first polarization component and the electric field information signal of the second polarization component are compensated for using the compensation value used for compensating for the electric field information signal of the first polarization component.

* * * * *